US010147129B1

(12) United States Patent
Shang et al.

(10) Patent No.: US 10,147,129 B1
(45) Date of Patent: Dec. 4, 2018

(54) DETERMINING COLLECTIONS OF SIMILAR ITEMS

(71) Applicant: Amazon Technologies, Inc., Seattle, WA (US)

(72) Inventors: Shang Shang, Seattle, WA (US); Andrea Qualizza, Phoenix, AZ (US); Cary Jordan Rotman, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 685 days.

(21) Appl. No.: 14/752,516

(22) Filed: Jun. 26, 2015

(51) Int. Cl.
*G06Q 30/00* (2012.01)
*G06Q 30/06* (2012.01)

(52) U.S. Cl.
CPC ..... *G06Q 30/0631* (2013.01); *G06Q 30/0633* (2013.01)

(58) Field of Classification Search
CPC ................................ G06Q 30/00; G06F 17/30
USPC .................................................. 705/332, 28
See application file for complete search history.

(56) References Cited

U.S. PATENT DOCUMENTS

| | | | |
|---|---|---|---|
| 6,266,649 B1 | 7/2001 | Linden et al. | |
| 6,629,097 B1* | 9/2003 | Keith | G06F 17/30598 |
| 6,907,315 B1* | 6/2005 | Hartman | G06Q 10/087 |
| | | | 700/216 |
| 7,818,303 B2* | 10/2010 | Buehrer | G06F 17/30861 |
| | | | 707/693 |
| 7,949,573 B1 | 5/2011 | Cohen et al. | |
| 8,560,461 B1* | 10/2013 | Tian | G06Q 10/087 |
| | | | 705/332 |
| 8,793,283 B1* | 7/2014 | Austern | G06F 17/30958 |
| | | | 707/798 |
| 8,965,998 B1 | 2/2015 | Dicker et al. | |
| 9,286,391 B1* | 3/2016 | Dykstra | G06F 17/30864 |
| 9,595,061 B1* | 3/2017 | Ryan | G06Q 30/0635 |
| 9,811,784 B2* | 11/2017 | Wan | G06Q 10/00 |
| 9,830,572 B2* | 11/2017 | Wan | G06Q 10/0836 |
| 9,928,535 B2* | 3/2018 | Kumar | G06Q 30/0633 |
| 2004/0015416 A1* | 1/2004 | Foster | G06Q 30/02 |
| | | | 705/26.61 |
| 2005/0038733 A1* | 2/2005 | Foster | G06Q 40/04 |
| | | | 705/37 |

(Continued)

OTHER PUBLICATIONS

Karypis et al., "Multilevel Graph Partitioning Schemes," Proc. 24th Intern. Conf. Par. Proc., III (1995).

(Continued)

*Primary Examiner* — Oluseye Iwarere
(74) *Attorney, Agent, or Firm* — Knobbe, Martens, Olson & Bear, LLP

(57) ABSTRACT

Systems and methods are provided for identifying groups of items that consumers are likely to purchase together. In some embodiments, a graph may be generated based on information regarding items that have been previously ordered together and information regarding the similarity or affinity between items. The graph may be analyzed to identify groups of items, wherein consumers are likely to order items in each group together. In some embodiments, each group of items may be assigned to a storage facility, and a list representative of the items stored in that storage facility may be modified to include the items in the group assigned to the storage facility.

20 Claims, 8 Drawing Sheets

(56) References Cited

U.S. PATENT DOCUMENTS

| | | | | |
|---|---|---|---|---|
| 2013/0261792 A1* | 10/2013 | Gupta | ................... | G06Q 10/08 |
| | | | | 700/232 |
| 2013/0262252 A1* | 10/2013 | Lakshman | ............ | G06Q 10/08 |
| | | | | 705/26.1 |
| 2013/0262276 A1* | 10/2013 | Wan | ...................... | G06Q 10/00 |
| | | | | 705/28 |
| 2013/0262336 A1* | 10/2013 | Wan | ................... | G06Q 10/0836 |
| | | | | 705/339 |
| 2014/0279294 A1* | 9/2014 | Field-Darragh | ..... | G06Q 10/087 |
| | | | | 705/28 |
| 2017/0193465 A1* | 7/2017 | Madura | .................. | G06Q 20/10 |
| 2018/0059906 A1* | 3/2018 | Gomez-Rosado | .......................... | |
| | | | | G06F 3/04817 |

OTHER PUBLICATIONS

Karypis et al., "Multilevel k-way Partitioning Scheme for Irregular Graphs," Journal of Parallel and Distributed Computing 48, 96-129 (1998).

Sauro, Jeff, "Customers Who Bought This Item Also Bought . . . Affinity Analysis Explained," Mar. 3, 2015, https://measuringu.com/affinity-analysis/.

* cited by examiner

DETERMINING COLLECTIONS OF SIMILAR ITEMS

BACKGROUND

Electronic commerce has become increasingly popular with consumers as the accessibility and ease of placing orders online or via the Internet continues to improve. At the same time, online retailers have continued to expand the availability of products and items available for purchase online or via the Internet to thousands, or even millions, of products. As a result, consumers may choose from an unprecedented variety of products or other items without leaving the home. In order to offer this wide selection of products, some electronic commerce retailers maintain numerous strategically placed fulfillment centers or other physical storage facilities that store products. After a consumer has placed an order for a product online or via the Internet, an order is received at the storage facility, and the product is shipped from the storage facility to the consumer.

However, due to physical limitations, a single storage facility typically cannot store every item that is offered for sale by some large electronic commerce retailers. As a result, in instances in which a customer orders multiple items, the retailer may be unable to fulfill the customer's order from inventory stocked in a single storage facility, and the retailer may need to ship different products included in the same order to the consumer from different storage facilities. This scenario in sometimes referred to as a "split order" because a single, multi-item order must be fulfilled by multiple shipments to the consumer. Because the popularity of shopping online or via the Internet and the number of products made available through electronic commerce is expected to increase in the near future, the issues of split orders will continue to be a challenge for online retailers.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
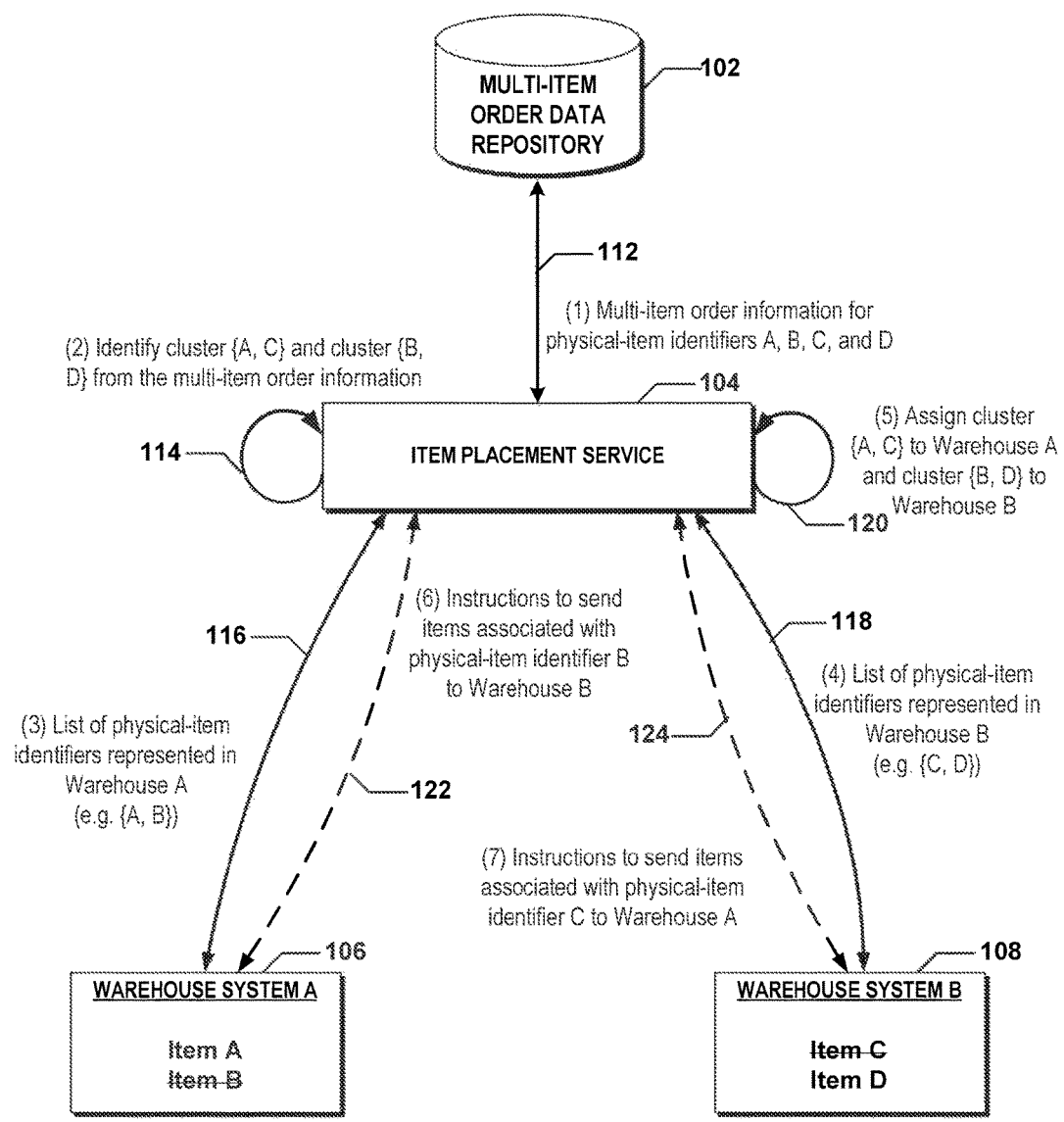
FIG. 1 is a system block diagram illustrating placement of physical items in a first storage facility and a second storage facility according to some embodiments.

The various embodiments will be described in detail with reference to the accompanying drawings. Wherever possible, the same reference numbers will be used throughout the drawings to refer to the same or like parts. References made to the particular examples and implementations are for illustrative purposes, and are not intended to limit the scope of the invention or the claims The terms "physical item," "item," and "product" are used interchangeably and refer to physical objects. In a non-limiting example, physical items may include common items made available for purchase online or via the Internet, such as apparel, cookware, and physical media (e.g., DVDs or CDs). As used herein, the term "item," in addition to having its ordinary meaning, is used interchangeably to refer to an item itself (e.g., a particular product) and to its description or representation in a computer system or electronic catalog. As will be apparent from the context in which it is used, the term is also sometimes used herein to refer only to the item itself or only to its representation in the computer system.

In various embodiments, each item is associated with a physical-item identifier that may be used to uniquely identify the item. In some embodiments, a physical-item identifier may be a stock keeping unit, universal product code, global trade item number, and/or any other product/item identifier used to differentiate physical items. In an example, a toaster item may be uniquely associated with a first physical-item identifier, and a microwave item may be uniquely associated with a second physical-item identifier. In some embodiments, an item may be associated with a physical-item identifier different than a physical-item identifier associated with another item when the two items differ in one or more respects. In an example, two items identical in every respect except for at least one feature (e.g., color, capabilities, physical properties, manufacturers, models, date of manufacturer, etc.) may be deemed as different items and, thereby, associated with different physical-item identifiers. While the above examples are intended to provide specific, non-limiting examples to demonstrate particular groupings/classifications of items, various other classification schemes used to associate an item with a particular physical-item identifier may be implemented in various embodiments without a loss of generality. For example, in some embodiments, different variations of an item (such as different colors or sizes of the same underlying clothing product by a given manufacturer) may share a single physical-item identifier. In other embodiments, such variations may each be assigned a different physical-item identifier.

As used herein, the term "multi-item order" refers to an order placed by a consumer that includes at least two physical items associated with distinct physical-item identifiers. For example, a multi-item order may include an order for a skillet, a hammer, and a hand-soap dispenser because each item in the order may be associated with a different physical-item identifier. In another example, a multi-item order may include an order for two or more of the exact same item (e.g., items with the same physical-item identifier) when the multi-item order also includes another item that is associated with a different physical-item identifier.

As noted above, online or e-commerce retailers continue to offer an increasingly diverse variety of items for sale to consumers. To accommodate consumers' orders for any number of the thousands or millions of distinct items available for purchase, online retailers typically store these items in numerous storage facilities located in various geographic areas. However, a storage facility can only store a certain number of physical items, and one storage facility frequently cannot hold a meaningful and/or a practical number of every item offered by an online retailer. As a result, some consumers' multi-item orders are fulfilled with items stocked in more than one storage facility, resulting in split orders. In comparison to orders that can be fulfilled from a single storage facility, split orders are undesirable for online retailers because split orders require coordination between storage facilities and typically result in higher shipping costs. Further, split orders are inconvenient for consumers as items ordered in the same multi-item order may be shipped at different times, potentially requiring the consumer to keep track of different delivery dates.

Currently, some retailers engaging in electronic commerce have attempted to organize the products stored in storage facilities to reduce the number of split orders. For example, some retailers in electronic commerce organize storage facilities to include items falling under the same broad category, such as all "sporting goods" items or all "apparel" items. However, such conventional strategies for organizing storage facilities fail to consider the likelihood that a consumer will order items in different general categories in the same order. For example, a storage facility storing "apparel" items may not have the physical space to store "fitness" items, requiring the online retailer to split a multi-item order for a work-out sweatshirt and hand weights.

A partial or suboptimal approach to addressing the underlying problem of split orders would be to organize physical items stored in a storage facility based on previous orders. Specifically, rather than organizing storage facilities based on broad categories of items as described above, multi-item orders received in the past may be analyzed to identify items that are frequently ordered with other items. For example, such an analysis may include determining that consumers who order toothpaste also frequently order toothbrushes. Information regarding the frequency that two (or more) items are co-ordered could be used to store these frequently co-ordered items in the same storage facility. However, this strategy for organizing storage facilities suffers from a lack of meaningful information regarding which items are actually frequently purchased with other items. Specifically, information about the frequency in which items are co-ordered is rarely sufficient for use in effectively managing the organization of storage facilities because this information is typically only repeated for a small percent of orders, month over month, and thus is usually not useful in determining the buying patterns of consumers.

In overview, aspects of the present disclosure include systems and methods that improve on conventional strategies of identifying or determining collections or clusters of items to be stored together in storage facilities, such as those described above. Specifically, in some embodiments, an item placement service may obtain information regarding co-ordered items included in multi-item orders, as well as information regarding the similarity and/or affinity of various items. Using this multi-item order information and similarity information, the item placement service may generate a graph that represents the degree to which each item is likely to be co-ordered with another item. The item placement service may then analyze the graph to identify groupings or clusters of items such that each cluster represents items that have a relatively high likelihood of being ordered together. By identifying a cluster of items that consumers are likely to order together, the item placement service may modify item placement information for a storage facility to reflect the items included in the cluster, such as by updating a list of physical item-identifiers that reflect the physical items currently stored (or that will be stored) at a particular storage facility, thereby ensuring that items represented in the cluster are stored at that particular storage facility.

In some embodiments, the item placement service may receive information for numerous multi-item orders, and each multi-item order may include or otherwise be associated with a plurality of physical-item identifiers representative of the items included in the multi-item order. For example, the item placement service may receive information for a multi-item order in which the multi-item order is associated with a first physical-item identifier for a hammer and a second physical-item identifier for a sponge. The item placement service may process the order information for a potentially large number of previous multi-item orders to generate a multi-item order graph that represents the degree to which items have been ordered together, according to some embodiments. Specifically, the multi-item order graph may include nodes for distinct physical-item identifiers and edges between each pair of nodes in which the associated identifiers have been associated with a common multi-item order. In some embodiments, for each pair of connected nodes, the item placement service may determine a number of times that the items represented by the nodes have been co-ordered and may "weight" the edge between that pair of connected nodes based on that number to reflect the degree to which the items represented by the connected pair of nodes have been ordered together.

The item placement service may also obtain "similarity information" related to items associated with various physical-item identifiers. In particular, similarity information may indicate similarities, affinities, and/or various other relationships between items. While similarity information may include information regarding items that have been ordered together, similarity information may also, or alternatively, include information describing other relationships between items with different physical-item identifiers. In some embodiments, similarity information may indicate items that consumers have purchased in separate orders over a predetermined period of time, such as all items ordered in the same day or in the same week. For example, the similarity information may indicate that consumers who ordered "item X" also ordered "item Y" within a two-week period. In another example, similarity information may indicate a connection between items that consumers have rated (e.g., consumers who "liked" item X also liked—or did not like—item Y). Similarity information may also reflect various other relationships between items, such as items that consumers have searched for near in time, items that are placed together in a virtual shopping cart without being ordered, and/or other relationships. Further, similarity information may indicate similarities between the items themselves, such as physical properties, capabilities, sizes, types, etc. For example, similarity information may indicate that a tennis ball is similar to a racquet ball because each item is used in a sport that requires a racquet to play.

In some embodiments, the items described in the similarity information may include a subset or portion of all items made available on an ecommerce service. For example, the subset of items may include only items with a certain popularity based on the number of total purchases of these items over a period of time, the average rating of the items, and/or other factors. In another example, the subset of items may be a representative sampling of all items included in the ecommerce service, such as a certain number of items in each item category (e.g., lawn and garden, apparel, automotive, etc.).

Using the similarity information, the item placement service may generate another graph (which may be referred to herein as a "similarity graph," according to some embodiments). The similarity graph may include a node for each distinct physical-item identifier associated with the items referenced in the similarity information, as well as edges between pairs of nodes. In some embodiments, the item placement service may assign a weight to an edge between the two nodes based on the calculated degree of similarity/affinity between items associated with physical-item identifiers represented by the those two nodes. For example, the item placement service may calculate the degree of similarity/affinity between two items by determining a number of consumers who liked both items, a number of consumers who bought the two items within a predetermined period of time, a number of times two items were searched in the same browsing session, etc. In some embodiments, the item placement service may reference the similarity information to determine a similarity "score" or value between two items and may determine the degree of similarity/affinity of those two items by comparing the similarity score to a threshold. In a non-limiting example, the item placement service may determine that there is a high degree of similarity/affinity between two items that have been searched for in the same browsing session for a threshold number of consumers (e.g., ten thousand people).

In various embodiments, the item placement service may merge the multi-item order graph and the similarity graph to generate an input graph used to identify clusters of physical-item identifiers associated with items that consumers are likely to order together, as noted above. Specifically, in some embodiments, the item placement service may modify or "filter" the multi-item order graph based on the similarity graph by excluding nodes from the multi-item order graph that are not included in the similarity graph and by adding edges in the similarity graph to the multi-item order graph. By "filtering" the multi-item order graph with the similarity graph, the item placement service may remove outliers and other spurious information that may have been included in the multi-item order graph. For example, although two unrelated, dissimilar items may have been previously ordered together in a single multi-item order, these two items may be unlikely to be included together in future orders due to their lack of similarity to each other.

The item placement service may analyze the input graph to identify clusters of physical-item identifiers, which as noted above, are represented as nodes in the input graph. The physical-item identifiers included in a cluster are associated with items that have a high likelihood of being co-ordered by a consumer in a future order. In some embodiments, the item placement service may analyze the edge weights between nodes in the input graph to identify clusters. For example, the item placement service may determine that two or more nodes with high edge weights between them may represent a cluster of physical-item identifiers because the high edge weights indicate a high likelihood that those physical-item identifiers will be represented in a common multi-item order. In some embodiments, the item placement service may identify clusters of physical-item identifiers by applying various clustering algorithms, such as a k-way partitioning algorithm.

In some embodiments, the item placement service may assign one or more of the identified clusters to a storage facility based at least in part on various factors, including the physical-item identifiers currently represented in the storage facility's inventory, the geographic location of the storage facility, the physical-item identifiers of items stored in nearby storage facilities, the physical size/capacity of the storage facility, etc. For example, the item placement service may assign a cluster of physical-item identifiers to a storage facility that already stores items associated with one or more physical-item identifiers in that cluster.

The item placement service may coordinate the placement of physical items in a storage facility based on the clusters assigned to that storage facility. In some embodiments, the item placement service may modify a list of physical-item identifiers representative of items currently stored in a storage facility to include each of the physical-item identifiers in a cluster of physical-item identifiers assigned to the storage facility. Similarly, the item placement service may additionally, or alternatively, modify a list of physical-item identifiers representative of items currently stored in a storage facility by excluding physical-item identifiers that are not included in a cluster currently assigned to that storage facility. In some embodiments, the item placement service may facilitate movement and storage of items in accordance with the determined clusters by, for example, generating various reports, delivery data, instructions and/or requests that the item placement service electronically delivers to one or more computers operated in association with a given storage facility or a given vendor responsible for providing items to a storage facility.

FIG. 1 is a block diagram illustrating placement of physical items in a first storage facility and a second storage facility, according to some embodiments. In some embodiments, an item placement service 104 may include one or more processors configured to perform one or more operations as described herein. Specifically, as noted above, the item placement service 104 may identify clusters of physical-item identifiers, where the physical-item identifiers in a cluster are likely to be represented in a common multi-item order. The item placement service 104 may leverage this information to modify the items that are stored in one or more storage facilities to ensure that items associated with a cluster of physical-item identifiers are stored together, thereby decreasing the likelihood of having to split multi-item orders that include those items.

As illustrated in FIG. 1, the item placement service 104 may be in communication with a multi-item order data repository 102. The item placement service 104 may also be in communication with computing devices operating at storages facilities, such as one or more computing devices operating at each of a Warehouse System A 106 and a Warehouse System B 108.

In some embodiments (not shown), the multi-item order data repository 102 may receive and store information regarding multi-item orders. The multi-item order information may be received from a retailer server (e.g., a retailer server 210 as described with reference to FIG. 2A) or from various other computing devices that receive multi-item orders from consumers. For example, as illustrated in FIG. 1, the multi-item order data repository 102 may have received and stored multi-item order information indicating that items associated with physical-item identifiers A, B, C, and D have been co-ordered. The acquisition and storage of multi-item order information is described further with reference to FIG. 2A below. As will be appreciated, physical-item identifiers used herein, such as "A" and "B" are used as representative identifiers for ease of description, while the actual stored physical-item identifiers may be substantially longer, multi-character and/or multi-digit strings or numbers.

In some embodiments, the multi-item order information may be associated with other data (e.g., metadata) describing various characteristics of the multi-item orders. For example, the metadata may include information related to the consumer who placed the order and the location of the consumer at the time the order was placed. In another example, the metadata may indicate the time at which the consumer placed the multi-item order, and in some embodiments, the multi-item order data repository 102 may be configured to organize multi-item order data chronologically.

The item placement service 104 may request and receive multi-item order information from the multi-item order data repository 102 via a communication 112. In the example illustrated in FIG. 1, the item placement service may receive multi-item order information for items associated with physical-item identifiers A, B, C, and D. In some embodiments, the multi-item order information may indicate the physical-item identifiers of items that were ordered together. For example, a multi-item order may include an order for an item associated with the physical-item identifier A, as well as an order for an item uniquely associated with the physical-item identifier B.

In some embodiments, the item placement service 104 may request multi-item order information that falls within a particular period of time, such as multi-item order information that has been received within the last two months. In such embodiments, the item placement service 104 may determine a time period expected to include a sufficient amount of multi-item orders, thereby enabling the item placement service 104 to obtain a meaningful corpus of data with which to generate a graph used to identify clusters of physical-item identifiers, as further described herein. For example, the item placement service 104 may determine a minimum threshold of time that is expected to include a meaningful number of multi-item orders. In such an example, a week of multi-item order information may not include a meaningful number of multi-item orders to determine item clusters, whereas two or three months of multi-item order information may include a sufficient number of orders to enable the item placement service 104 to generate a graph that is a more accurate representation of consumers' multi-item ordering habits.

In operation 114, the item placement service 104 may identify a first cluster of physical-item identifiers that includes identifiers A and C and may also identify a second cluster of physical-item identifiers that includes identifiers B and D. In some embodiments, the item placement service 104 may identify the clusters of physical-item identifiers by generating a graph of nodes representing each distinct physical-item identifier and may partition the graph into clusters of nodes that have a high likelihood of being placed in a common multi-item order. The process of identifying the clusters of physical-item identifiers is described further with reference to FIGS. 3-5.

In some embodiments, one or more computing devices in, or otherwise associated with, each of the Warehouse Systems 106 and 108 may be configured to manage inventory information and/or placement information for physical items in their respective storage facility. In such embodiments, the one or more computing devices of each storage facility may maintain a list of physical-item identifiers that identify the items stored in each storage facility. For instance, the list of physical-item identifiers maintained in the Warehouse System A 106 may indicate that the Warehouse A (not shown) is storing items associated with physical-item identifier A (e.g., Item "A") and physical-item identifier B (e.g., Item "B"). Similarly, a list of items maintained in the Warehouse System B 108 may indicate that the Warehouse B (not shown) is currently storing items associated with physical-item identifier C (e.g., Item "C") and physical-item identifier D (e.g., Item "D").

The item placement service 104 may request and receive a list of physical-item identifiers representative of the items stored in the Warehouse A from one or more computing devices operating in the Warehouse System A 106 via a communication 116. Likewise, via a communication 118, the item placement service 104 may request and receive information regarding a list of physical-item identifiers representative of items stored in the Warehouse B from one or more computing devices operating in the Warehouse System B 108.

Figure 2A:
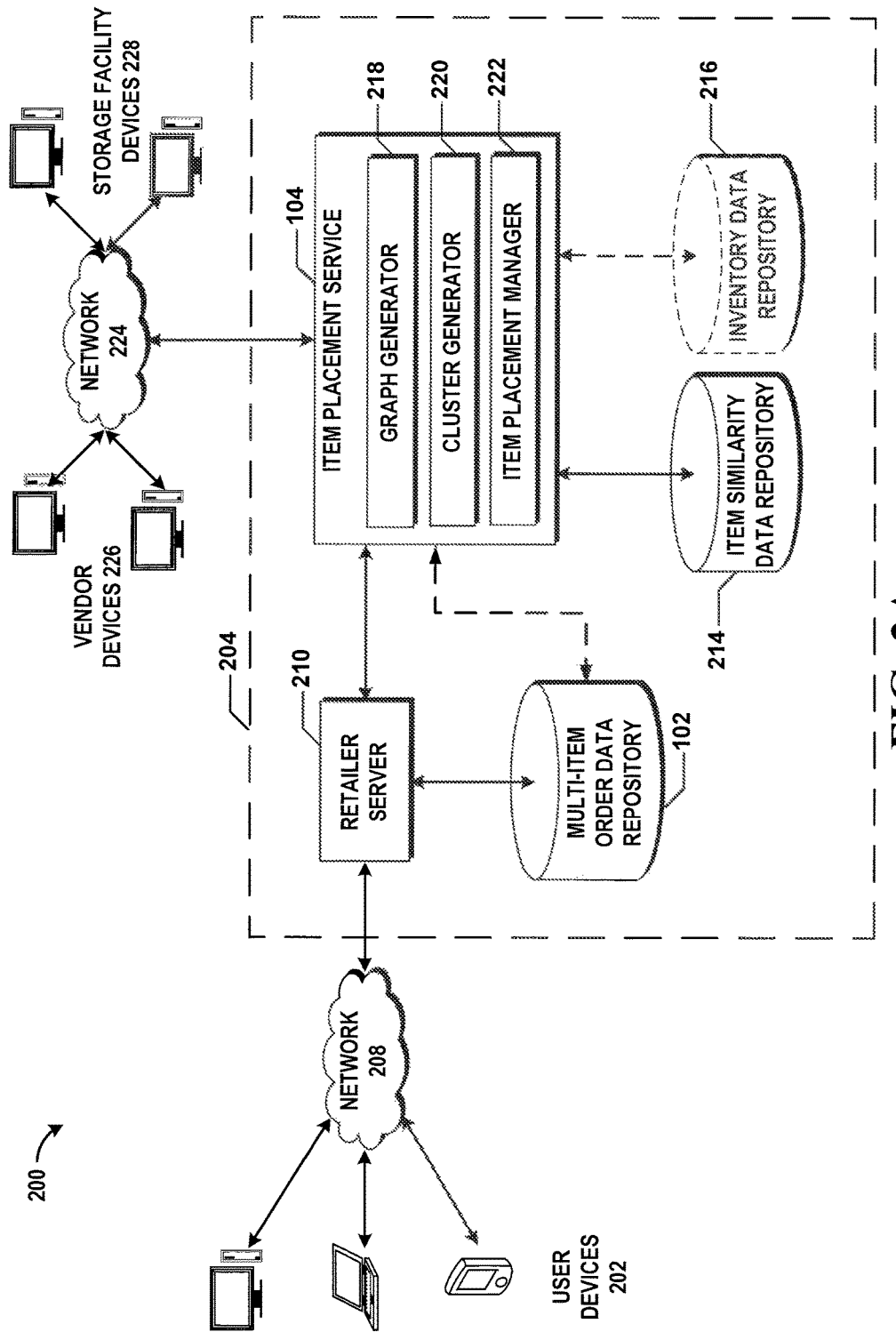
FIG. 2A is a communication system block diagram of a network suitable for use with the various embodiments.

While FIG. 1 illustrates the item placement service 104 receiving the lists of physical-item identifiers representing the inventory stored in the Warehouses A and B, in other embodiments, the item placement service 104 (or a separate data storage unit, such as an inventory data repository 216 as described further with reference to FIG. 2A) may maintain a centralized database of inventory information for various storage facilities. As such, the item placement service 104 may obtain lists of physical-item identifiers associated with each storage facility from a centralized location without individually requesting such information from the storage facilities. For example, the item placement service 104 may retrieve placement information regarding the items stocked in the Warehouses A and B from memory maintained on the item placement service 104 rather than stored on one or more computing devices in the Warehouse Systems 106 and 108.

In operation 120, the item placement service 104 may assign each cluster identified in operation 114 to the appropriate one of the Warehouses A and/or B. In the example illustrated in FIG. 1, the item placement service 104 may assign the cluster that includes physical-item identifiers A and C to the Warehouse A. The item placement service 104 may also assign the cluster that includes physical-item identifiers B and D to the Warehouse B. In some embodiments, at operation 120, the item placement service 104 may compare the physical-item identifiers represented in the lists of physical-item identifiers stored in each of the Warehouse Systems 106 and 108 with the clusters of physical-item identifiers identified in operation 114. In some embodiments, the item placement service 104 may attempt to modify the lists of physical-item identifiers based on the identified clusters. Specifically, the item placement service 104 may analyze a list of physical-item identifiers to determine whether physical-item identifiers should be added or removed from the list to better represent the clusters identified in operation 114.

For instance, in the example illustrated in FIG. 1, the item placement service 104 may determine that the list of physical-item identifiers maintained in the Warehouse System A 106 should be modified to represent the cluster of physical-item identifiers including physical-item identifiers A and C. As a result, the item placement service 104 may modify the list of physical-item identifiers maintained in the Warehouse System A 106 to remove the physical-item identifier B and to include the physical-item identifier C. Similarly, the item placement service 104 may modify the list of physical-item identifiers maintained in the Warehouse System B 108 to substitute physical-item identifier C with physical-item identifier B, thereby ensuring that the cluster of physical-item identifiers B and D are represented in the list for Warehouse B.

In some optional embodiments, one or more computing devices in each of the Warehouse Systems 106 and 108 may be managed, controlled, or informed by the item placement service 104. In such embodiments, the item placement service 104 may coordinate the transfer of items between the Warehouses 106 and 108 based on the clusters of physical-item identifiers assigned to each of the warehouses. In the example illustrated in FIG. 1, the item placement service 104 may optionally send instructions to the Warehouse A 106 to send items associated with the physical-item identifier B to the Warehouse B 108, thereby causing the inventory of the Warehouse B 108 to reflect the cluster of physical-item identifiers B and D assigned to the Warehouse B 108 in operation 120. Likewise, the item placement service 104 may optionally send instructions to the Warehouse B 108 to transfer items associated with physical-item identifier C to the Warehouse A 106 to cause the inventory of the Warehouse A 106 to include items representative of the cluster of physical-item identifiers A and C assigned to the Warehouse A 106 in operation 120.

While the operations of FIG. 1 are discussed with reference to a non-limiting example in which the item placement service 104 assigns one cluster to each of the Warehouse System A 106 and the Warehouse System B 108, the item placement service 104 may also (or alternatively) assign one or more clusters to each of the Warehouse Systems 106 and 108. Further, the item placement service 104 may also assign the same or different clusters to each of the Warehouse Systems 106 and 108, in some embodiments.

In some embodiments (not shown), the item placement service 104 may similarly coordinate the placement of inventory corresponding to one or more clusters of physical-item identifiers assigned to the Warehouses A and B by sending instructions to one or more vendors that provide items to the Warehouses A and/or B. For example, the item placement service 104 may instruct a vendor that supplies items associated with the physical-item identifier B to deliver those items to the Warehouse B instead of delivering them to the Warehouse A.

FIG. 2A is a functional block diagram of an illustrative operating environment 200 suitable for implementing aspects of the present disclosure. The operating environment 200 includes a system 204, which may include an item placement service 104, such as the item placement service 104 described with reference to FIG. 1. In some embodiments, the item placement service 104 may include a graph generator 218, a cluster generator 220, and an item-placement manager 222, each of which may be stored in memory therein and may be used to implement various aspects of the present disclosure.

In some embodiments, the item placement service 104 may execute the graph generator 218 in order to generate graphs that include nodes representative of physical-item identifiers and edges between nodes. Such graphs may include a multi-item order graph generated from multi-item order information, a similarity graph generated from item similarity information, and an input graph generated from the multi-item order graph and the similarity graph, as further described herein. The item placement service 104 may also execute the cluster generator 220 to identify clusters of physical-item identifiers in the input graph. The item placement service 104 may also execute the item-placement manager 222 to assign identified clusters of physical-item identifiers to storage facilities and to update lists of items stored in storage facilities based on the assigned clusters, thereby ensuring that items related to the same cluster of physical-item identifiers are stored in the same storage facility. The graph generator 218, cluster generator 220, and item placement manager 222 are described in further detail with reference to FIG. 2B.

The item placement service 104 may be in communication with a retailer server 210. In some embodiments, the retailer server 210 may facilitate electronic browsing and purchasing of physical items using various user devices, such as user computing devices 202. Those skilled in the art will recognize that the user computing devices 202 may be any of a number of computing devices that are capable of communicating over a network 208 including, but not limited to, a laptop, personal computer, personal digital assistant (PDA), hybrid PDA/mobile phone, mobile phone, smartphone, wearable computing device, electronic book reader, digital media player, tablet computer, gaming console or controller, kiosk, augmented reality device, other wireless device, set-top or other television box, and the like.

In some embodiments, the retailer server 210 may be generally responsible for providing front-end communication with various user devices, such as user computing devices 202, via a network 208. The front-end communication provided by the retailer server 210 may include generating text and/or graphics, possibly organized as a user interface using hypertext transfer or other protocols in response to information inquiries received from the various user devices. The retailer server 210 may obtain information on available items/products from one or more data stores (not shown), as is done in conventional electronic commerce systems. In some embodiments, the retailer server 210 may also access item data from other data sources, either internal or external to the system 204. While the system 204 is sometimes described herein with respect to an embodiment in which the item placement service 104 communicates with the retailer server 210, in other embodiments, the item placement service 104 may operate independently of a retail environment. In some such embodiments, the item placement service 104 may communicate with the user computing devices 202 without the presence of the retailer server 210, or may communicate with another server responsible for providing front-end communication with the user computing devices 202. In other embodiments, the retailer server 210 may include or implement an item placement service, as described herein, such that a separate item placement service 104 may not be present in certain embodiments.

In some embodiments, the retailer server 210 may be connected to and/or in communication with a multi-item order data repository (e.g., the multi-item data repository 102 described with reference to FIG. 1) that stores item information, metadata, and/or attributes regarding multi-item orders received from the user devices 202 via the network 208. For example, the multi-item order data repository 102 may store information regarding the items included in a multi-item order, as well as the physical-item identifiers associated with each of the ordered items. In some embodiments, the multi-item order data repository 102 may additionally store information regarding the user who initiated the multi-item order, the time at which the order was placed, the geographic location of the user device used to place the multi-item order, and/or other information.

The item placement service 104 may receive multi-item order information from the multi-item order data repository 102 by requesting this information from the retailer server 210. Optionally, the item placement service 104 may be in direct communication with the multi-item order data repository 102 and may obtain multi-item order information directly from the multi-item order data repository 102. In some embodiments, the item placement service 104 executing the graph generator 218 may obtain multi-item order data from the repository 102 and may generate a multi-item order graph to represent distinct physical-item identifiers associated with co-ordered items included in the multi-item orders. Generating the multi-item order graph using multi-item order data is described further with reference to FIG. 4A.

The item placement service 104 may further be in communication with an item similarity data repository 214. In some embodiments, the item similarity data repository 214 may include information and/or a score representing the affinity, similarity, or other relational information of one item to another item. For example, the item similarity data repository 214 may include information that an item associated with a physical-item identifier has a certain affinity for an item associated with another physical-item identifier. This affinity/similarity information between two items may be represented as a score indicating the likelihood that a consumer who orders a first item associated with the first physical-item identifier will order a second item associated with the second physical-item identifier. In some embodiments, this affinity/similarity information may be asymmetrical such that the first item's affinity for the second item may be different from the second item's affinity for the first item. In some embodiments, the item placement service 104 may execute the graph generator 218 to obtain the item similarity information and may convert that information into a similarity graph as further described, for example, with reference to FIG. 4A.

The item placement service 104 may execute the cluster generator 220 to analyze the input graph generated using the graph generator 218 to identify a plurality of clusters of physical-item identifiers such that each cluster of identifiers is associated with items that consumers are likely to order together. The process of identifying clusters of physical-item identifiers is further described below with reference to FIG. 4B.

The item placement service 104 may execute the item placement manager 222 to assign one or more identified clusters to a storage facility. In some embodiments, the item placement service 104 may assign one or more clusters to a storage facility based on information regarding the storage facility's current inventory (e.g., the physical-item identifiers currently represented in the storage facility's inventory) and/or the storage facility's current capacity. The item placement service 104 may receive inventory information of a storage facility from the storage facility devices 228 via a network 224. In some optional embodiments, the item placement service 104 may be in communication with an inventory data repository 216, which may store inventory information regarding the items or physical-item identifiers currently represented in one or more storage facilities.

The information regarding the storage facility's inventory may be in the form of a list of physical-item identifiers that reflect the items currently stored in the storage facility. The item placement service 104 executing the item placement manager 222 may modify a storage facility's inventory information to include or exclude physical-item identifiers based on the one or more clusters assigned to the storage facility to cause the storage facility to include items associated with each physical-item identifier included in the one or more assigned clusters.

In some embodiments, the item placement service 104 executing the item placement manager 222 may send instructions to the storage facility devices 228 to cause the transfer of items between storage facilities based on the one or more clusters assigned to each respective storage facility (e.g., as described with reference to FIG. 1).

In some optional embodiments, the item placement service 104 may be in communication with one or more vendor devices 226. In such embodiments, the item placement service 104 executing the item placement manager 222 may transmit instructions to a vendor that supplies items associated with a particular physical-item identifier to send those items to a storage facility associated with a cluster of physical-item identifiers that includes that particular physical-item identifier. In some instances, the instructions sent to a given vendor may only include information relevant to the items supplied by that vendor. As such, rather than informing the vendors of each physical-item identifier in a cluster assigned to a storage facility, the instructions for a given vendor may only include references to physical-item identifiers that identify items provided by the given vendor.

It will be recognized that many of the devices described above are optional and that embodiments of the system 204 may or may not combine devices. Furthermore, devices need not be distinct or discrete. Devices may also be reorganized in the system 204. For example, the item placement service 104 may be represented in a single physical server or, alternatively, may be split into multiple physical servers.

Additionally, in some embodiments, the item placement service 104 may be implemented by one more virtual machines implemented in a hosted computing environment. The hosted computing environment may include one or more rapidly provisioned and/or released computing resources. The computing resources may include hardware computing, networking and/or storage devices configured with specifically configured computer-executable instructions. A hosted computing environment may also be referred to as a "cloud" computing environment.

Each of the networks 208 and/or 224 may be any wired network, wireless network or combination thereof. In addition, each of the networks 208 and/or 224 may be a personal area network, local area network, wide area network, cable network, satellite network, cellular telephone network, etc. or combination thereof. In addition, each of the networks 208 and/or 224 may be a personal area network, local area network, wide area network, over-the-air broadcast network (e.g., for radio or television), cable network, satellite network, cellular telephone network, or combination thereof. For example, the network 208 may be a publicly accessible network of linked networks, possibly operated by various distinct parties, such as the Internet. In some embodiments, the networks 208 and/or 224 may be private or semi-private networks, such as a corporate or university intranets. Each of the networks 208 and/or 224 may include one or more wireless networks, such as a Global System for Mobile Communications (GSM) network, a Code Division Multiple Access (CDMA) network, a Long Term Evolution (LTE) network, or some other type of wireless network. The networks 208 and/or 224 may use protocols and components for communicating via the Internet or any of the other aforementioned types of networks. Protocols and components for communicating via the Internet or any of the other aforementioned types of communication networks are well known to those skilled in the art and, thus, are not described in more detail herein.

The system 204 is depicted in FIG. 2A as operating in a distributed computing environment 200 including several computer systems that are interconnected using one or more computer networks. The system 204 may also operate within a computing environment having a fewer or greater number of devices than are illustrated in FIG. 2A. Thus, the depiction of the system 204 in FIG. 2A should be taken as illustrative and not limiting to the present disclosure. For example, the system 204 could implement various Web services components and/or peer-to-peer network configurations to implement at least a portion of the processes described herein.

Figure 2B:
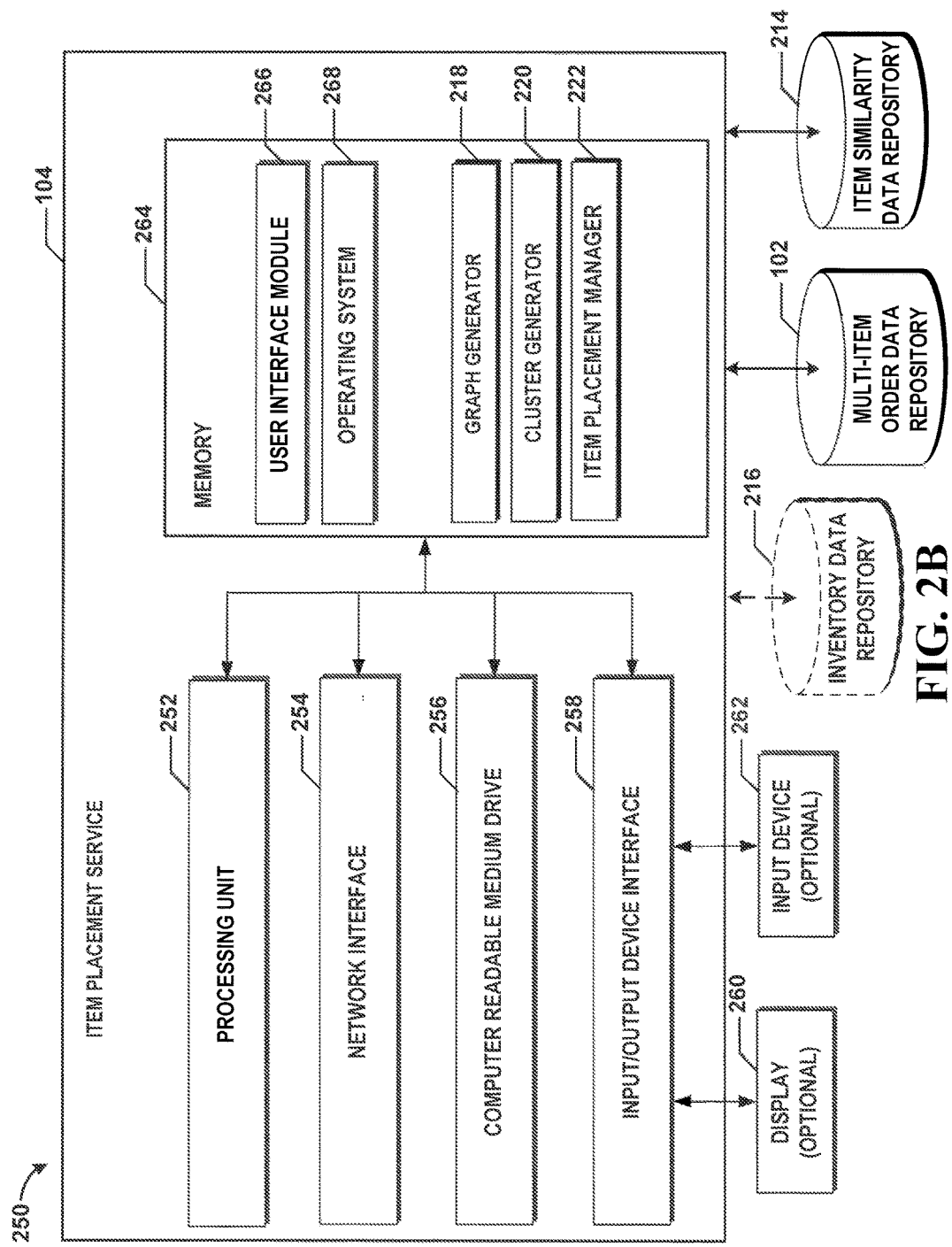
FIG. 2B is a component diagram of an example item placement service suitable for use with the various embodiments.

FIG. 2B depicts a general architecture of a computing system (referenced as item placement service 104) that receives multi-item order information and similarity information as described above, generates an input graph based on the received information, identifies clusters of physical-item identifiers based on an analysis of the input graph, and modifies a list of physical-item identifiers representative of physical items stored in a storage facility based on the identified clusters, according to some embodiments.

The general architecture of the item placement service 104 depicted in FIG. 2B includes an arrangement of computer hardware and software components that may be used to implement aspects of the present disclosure. The item placement service 104 may include many more (or fewer) elements than those shown in FIG. 2B. It is not necessary, however, that all of these generally conventional elements be shown in order to provide an enabling disclosure. As illustrated, the item placement service 104 includes a processing unit 252, a network interface 254, a computer readable medium drive 256, an input/output device interface 258, an optional display 260, and an optional input device 262, all of which may communicate with one another by way of a communication bus. The network interface 254 may provide connectivity to one or more networks or computing systems. For example, the processing unit 252 may thus receive and/or send information and instructions from/to other computing systems or services via the networks 208 and/or 224. The processing unit 252 may also communicate to and from memory 264 and further provide output information for the optional display 260 via the input/output device interface 258. The input/output device interface 258 may also accept input from the optional input device 262, such as a keyboard, mouse, digital pen, microphone, touch screen, gesture recognition system, voice recognition system, image recognition through an imaging device (which may capture eye, hand, head, body tracking data and/or placement), gamepad, accelerometer, gyroscope, or other input device known in the art.

The memory 264 may contain computer program instructions (grouped as modules or components in some embodiments) that the processing unit 252 executes in order to implement one or more embodiments. The memory 264 generally includes RAM, ROM, and/or other persistent, auxiliary or non-transitory computer-readable media. The memory 264 may store an operating system 268 that provides computer program instructions for use by the processing unit 252 in the general administration and operation of the item placement service 104. The memory 264 may further include computer program instructions and other information for implementing aspects of the present disclosure. For example, in one embodiment, the memory 264 may include a user interface module 266 that generates user interfaces (and/or instructions therefor) for display upon a computing device, e.g., via a navigation interface, such as a browser or application installed on the computing device. In addition, the memory 264 may include or communicate with the multi-item order data repository 102, the inventory data repository 216, the item similarity data repository 214, and/or one or more other data stores, as discussed above with reference to FIG. 2A.

In some embodiments, the memory 264 may include the graph generator 218, the cluster generator 220, and the item placement manager 222, each of which may be executed by the processing unit 252 to perform operations, such as those operations described with reference to FIG. 2A. In one embodiment, the graph generator 218, the cluster generator 220, and the item placement manager 222 individually or collectively implement various aspects of the present disclosure, e.g., generating an input graph based on multi-item order information and similarity information, identifying clusters of physical-item identifiers by analyzing the input graph, and modifying a list of physical-item identifiers representative of items stored in a storage facility based on the clusters of physical-item identifiers assigned to the storage facility. While the graph generator 218, the cluster generator 220, and the item placement manager 222 are shown in FIG. 2B as part of the item placement service 104, in other embodiments, all or a portion of the graph generator 218, the cluster generator 220, and the item placement manager 222 may be implemented by the retailer server 210 and/or another computing device. For example, in certain embodiments of the present disclosure, the retailer server 210 may include several components that operate similarly to the components illustrated as part of the item placement service 104, including a user interface module, a graph generator, a cluster generator, an item placement manager, a processing unit, computer readable medium drive, etc. In such embodiments, the retailer server 210 may communicate with the multi-item order data repository 102, the inventory data repository 216, and the item similarity data repository 214. As a result, the item placement service 104 may not be needed in certain embodiments.

Figure 3:
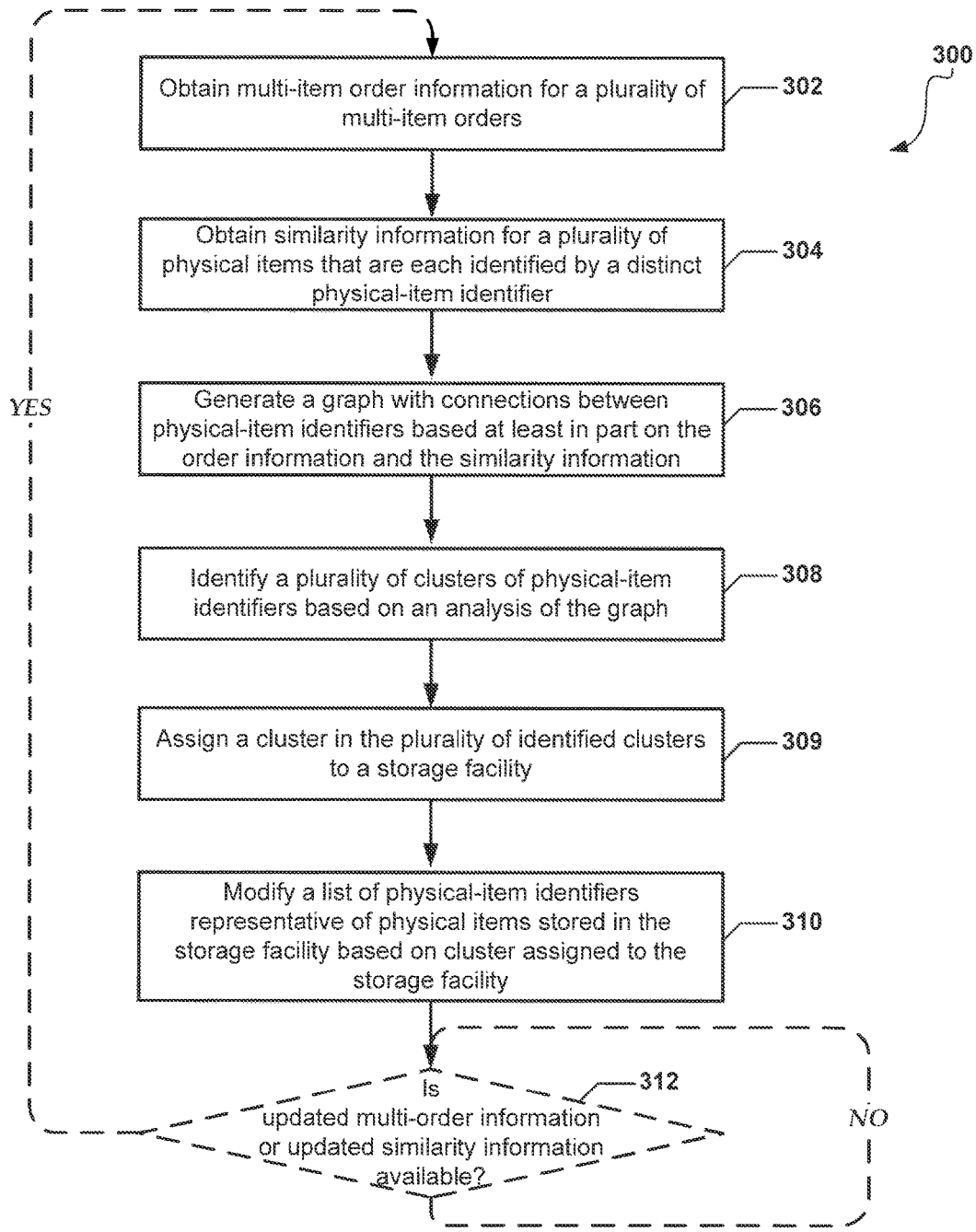
FIG. 3 is a process flow diagram illustrating a method, implemented at least in part by an item-placement service, for modifying a list of physical-item identifiers representing physical items stored in a storage facility based on identified clusters of physical-item identifiers, according to some embodiments.

FIG. 3 is a flow diagram of an illustrative method 300 for identifying clusters of physical-item identifiers based on multi-item order information, according to various embodiments. In some embodiments, the method 300 may be implemented by an item placement service (e.g., the processing unit 252 of the item placement service 104 as described with reference to FIG. 2B).

As described above, storage facilities are unable to hold an unlimited quantity of every type of item that a given retailer may offer for sale to consumers online or via the Internet. As a result, storage facilities typically store only certain types of items. If a consumer places an order for multiple items and a single storage facility does not carry each item in the order, the consumer's order will be split between multiple storage facilities, thereby increasing the logistical complexity and cost of shipping each item in the order to the consumer. The item placement service may perform the operations of the method 300 to decrease the likelihood of splitting multi-item orders by identifying items that are likely to be ordered together and ensuring that these groups of items are stored in the same storage facility.

In block 302, the item placement service may obtain multi-item order information for a plurality of multi-item orders, such as by retrieving order information from multi-item order data repository 102. As described above, each multi-item order may be an order for two or more items associated with different physical-item identifiers. For example, the obtained multi-item order information for each order may identify (by a physical-item identifier or other identification information) each of two or more items that were ordered by a consumer within a single order and/or that were shipped within a certain time period to the same consumer. In some embodiments, the item placement service may utilize the multi-item order information to generate a multi-item order graph as further described, for example, with reference to FIGS. 4A and 5.

The multi-item order graph may include nodes for each distinct physical-item identifier associated with the multi-item orders, as well as edges between nodes representative of physical-item identifiers that are associated with a common multi-item order. The item placement service may calculate a weight for an edge between two nodes in the multi-item order graph based on a number of multi-item orders that are common to both of the physical-item identifiers associated with the two nodes. In some such embodiments, the weight may represent a measure of how likely those two physical-item identifiers are to appear together in a future multi-item order.

The item placement service may obtain similarity information for a plurality of physical items that are each identified by a distinct physical-item identifier, in block 304. In some embodiments, the plurality of items described in the similarity information may represent a subset or portion of all items made available on an ecommerce service. As noted above, this subset of items may include items that exceed a particular popularity threshold based on a number of purchases, average rating, etc. In another example, the plurality of items may represent a sample of all items offered by the ecommerce service, such as a certain number of items in each item category (e.g., lawn and garden, apparel, automotive, etc.).

In some embodiments, the similarity information may indicate similarities, affinities, and/or other relationships between two items. Specifically, similarity information may indicate a relationship between items that consumers have purchased in separate orders over a predetermined period of time, a connection between items that consumers have rated, and/or various other relationships between items, such as items that consumers have searched for near in time, items that are placed together in a virtual shopping cart without being ordered, etc. Further, similarity information may indicate similarities between the items, themselves, such as physical properties, capabilities, sizes, types, etc. In some embodiments, the similarity information will indicate an affinity or similarity score between an item associated with a distinct physical-item identifier and each of a number of other items associated with other physical-item identifiers (e.g., 100 other items).

In some embodiments, the item placement service may utilize the similarity information to generate a similarity graph as further described with reference to FIGS. 4A and 5. In such embodiments, the similarity graph may include a node for each distinct physical-item identifier described in the similarity information. An edge between two nodes in the similarity graph may indicate that at least one of the underlying items represented by the two nodes has an affinity, similarity, or other relational connection with the other item. In some embodiments, the item placement service may calculate a weight for an edge that represents the degree or extent of affinity and/or similarity between the items associated with the physical-item identifiers represented by the two nodes.

While the operations performed in block 302 are illustrated as occurring before the operations of block 304 in FIG. 3, the order of operations of block 302 and 304 may be performed in any order, including simultaneously or in parallel, in various embodiments.

In block 306, the item placement service may generate a graph with connections between physical-item identifiers (represented as nodes in the graph) based at least in part on the order information obtained in block 302 and the similarity information obtained in block 304. The graph may include nodes that represent distinct physical-item identifiers derived from the multi-item order information and the similarity information. Edges between two nodes in the graph may indicate that the physical-item identifiers represented by the two nodes have been associated with the same multi-item order (e.g., that a first item and a second item, represented as two different nodes with an edge between them, have been ordered together in the same order at least once) or that the items associated with the physical-item identifiers share some affinity/similarity as indicated in the similarity information. In some embodiments, the item placement service may calculate a weight for an edge between two nodes that is representative of the likelihood that consumers will co-order items associated with the physical-item identifiers represented by the two nodes.

In some embodiments, the item placement service may generate the graph in block 306 by merging a multi-item order graph created using the multi-item order information and a similarity graph created using the similarity information to produce the graph in block 306, as further described with reference to FIGS. 4A and 5.

Based on an analysis of the graph generated in block 306, the item placement service may identify a plurality of clusters of physical-item identifiers, in block 308. Specifically, in some embodiments, the item placement service may partition the graph based on the relationships of the nodes included in the graph to minimize the weighted sum of edges that are cut/removed to produce the clusters. The process of identifying clusters of physical-item identifiers in the graph is described further with reference to FIGS. 4B and 5.

In block 309, the item placement service may assign a cluster in the plurality of identified clusters to a storage facility, such as based on information regarding the storage facility's current inventory and/or storage capacity. The item placement service may receive such information directly from the storage facility and/or may receive the information from a centralized repository (e.g., the inventory data repository 216 as described with reference to FIGS. 2A and 2B). In some embodiments, the item placement service may determine the physical-item identifiers that are and are not represented in the storage facility's inventory. The item placement service may further utilize a mathematical model to determine the costs of including (or excluding) items associated with the physical-item identifiers included in cluster assigned to the storage facility. The model may consider various factors, including the physical-item identifiers currently represented in the storage facility's inventory, the cost of transferring items associated with physical-item identifiers in the assigned cluster to the storage facility (e.g., from another storage facility), the physical storage limits of the storage facility, the distance of the storage facility to other storage facilities that carry items associated with the assigned cluster, and/or other factors. In such embodiments, the item placement service may assign a cluster identified in block 308 to the storage facility if the cost of storing items associated with the physical-item identifiers in the assigned cluster is below a certain cost threshold.

In block 310, the item placement service may modify a list of physical-item identifiers representative of physical items stored in a storage facility based on the cluster assigned to the storage facility in block 309. For example, the item placement service may modify, in an electronic data store, a storage facility's list of physical-item identifiers to include one or more physical-item identifiers that are included in the assigned cluster of physical-item identifiers but not represented in the storage facility's previously stored list of physical-item identifiers.

In some embodiments of the operations performed in block 310, the item placement service may initiate the shipment of items associated with one or more physical-item identifiers in the assigned cluster to the storage facility. For example, the item placement service may initiate transfer of these items to a first storage facility from a second storage facility that is not associated with the assigned cluster, such as by sending an electronic message to a computing device of the second storage facility prompting a system operator to begin transfer of the items to the first storage facility. In another example, the item placement service may send instructions to one or more vendors to supply the items associated with the physical-item identifiers of the assigned cluster to the storage facility.

In some optional embodiments, the item placement service may determine whether updated multi-item order information or updated similarity information is available, in optional determination block 312. In some embodiments, new or updated multi-item order information and/or similarity information may include the most recent information regarding items that have been co-ordered by consumers. As such, the item placement service may utilize the updated information to refine the clusters of physical-item identifiers that are identified in block 308 and assigned in block 309.

In response to determining at block 312 that no updated information is currently available, the item placement service may continue performing the operations in optional determination block 312 until updated information is available. Alternatively, in response to determining at block 312 that updated information is available, the item placement service may repeat the above operations starting with block 302 by obtaining updated order information for a plurality of multi-item orders.

For ease of description, the above description of the operations performed in blocks 309 and 310 refers to assigning a cluster to a storage facility. However, the item placement service may additionally assign a single cluster identified in block 308 to another storage facility. In some embodiments, the item placement service may assign multiple clusters identified in block 308 to each of multiple storage facilities, in block 309. In such embodiments, the item placement service may perform operations similar to those operations described with reference to blocks 309 and 310 above for each cluster assigned to each storage facility.

Further, in some embodiments (not shown), the item placement service may utilize the information represented in the clusters to perform operations in addition to (or instead of) assigning clusters to a storage facility and modifying the storage facility's lists of physical-item identifiers as described with reference to blocks 309 and 310. In a non-limiting example, the item placement service or another component of the system may use the information regarding the plurality of clusters identified in block 308 to update or train a recommendation system that informs users of combinations of items that the user may wish to purchase together, and/or that otherwise determines items to suggest or present to a given user. In this example, by identifying the clusters of physical-item identifiers in block 308, the item placement service may identify the items that many users purchase together in the same order and may present two or more items associated with the same cluster of identifiers to a prospective customer. In a further example, the item placement service may assign items associated with a cluster to a storage facility and may recommend that users purchase these items, such as by offering a discount on shipping or some other incentive if the user purchases items associated with the same cluster because the items are stored in the same storage facility and thus may be less expensive to ship together than the cost of shipping items that are not associated with the same cluster.

Figure 4A:
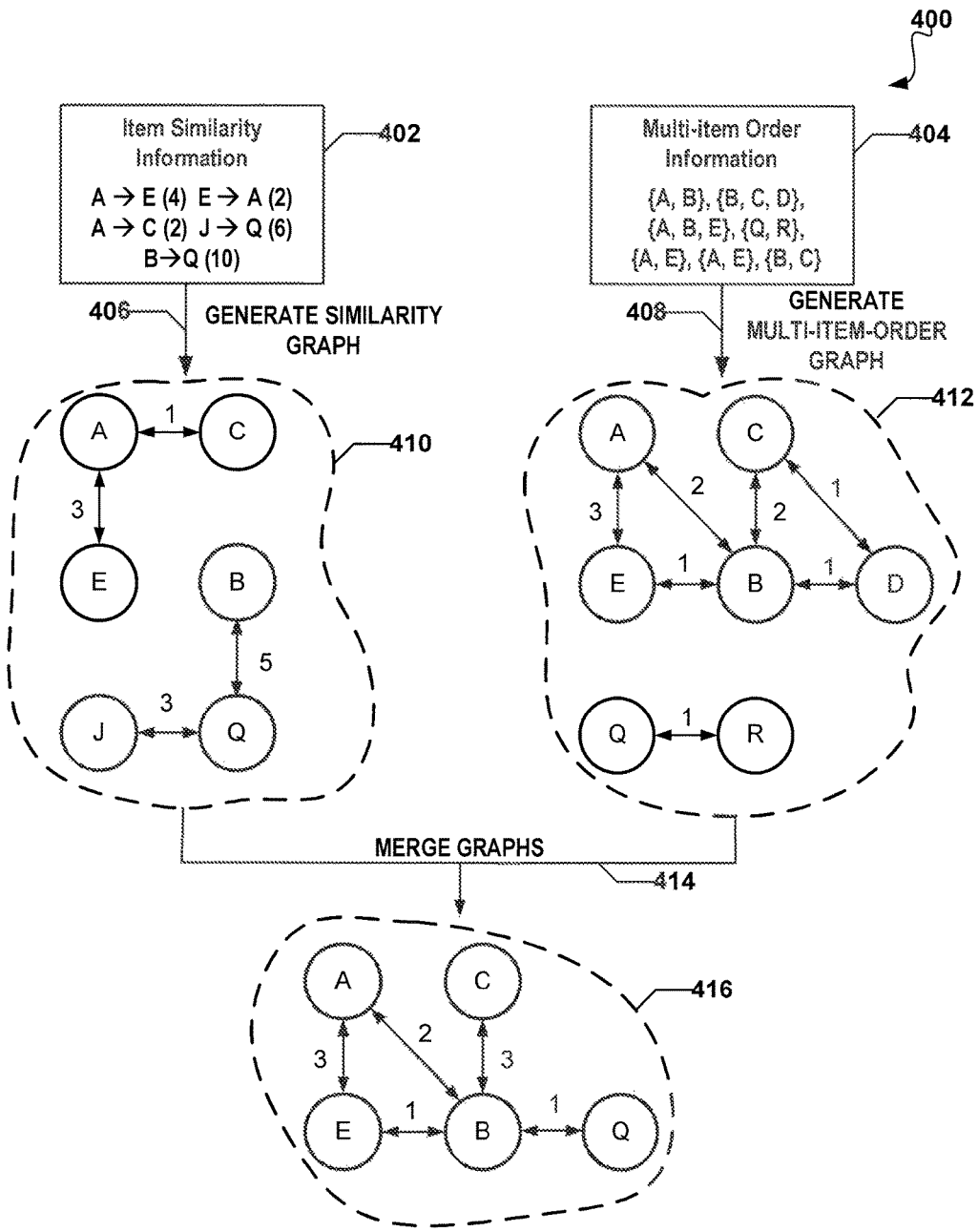
FIG. 4A is a component diagram illustrating a process for generating an input graph of physical-item identifiers by generating and merging a similarity graph and a multi-item order graph, according to some embodiments.

FIG. 4A illustrates a component diagram representing an example process 400 of generating an input graph, according to various embodiments. In some embodiments, the process 400 may be performed by one or more processors of the item placement service (e.g., the processing unit 252 of the item placement service 104 as described with reference to FIG. 2B).

As described above (see the method 300 of FIG. 3), the item placement service may obtain multi-item order information and similarity information for physical-item identifiers in order to generate an input graph that includes nodes for each distinct physical-item identifier and edges between nodes representative of the likelihood that the nodes appear in a common multi-item order.

The item placement service may obtain multi-item order information 404 regarding a plurality of multi-item orders, for instance, from the multi-item order data repository 102 as described with reference to FIGS. 1, 2A, and 2B. In the example illustrated in FIG. 4A, the multi-item order information 404 includes information for seven separate multi-item orders, and each of these multi-item orders includes at least two physical-item identifiers representative of the items included in the order (e.g., physical-item identifiers A-E, Q, and R). For example, a first multi-item order may include information regarding physical-item identifiers A and B, and a second multi-item order may include information regarding physical-item identifiers B, C, and D. In some embodiments, the item placement service may identify the physical-item identifiers that are associated with each multi-item order in the multi-item order information 404, such as by identifying the items included in an multi-item order and performing a lookup operation to determine the physical-item identifiers associated with those items. For example, the item placement service may determine that a multi-item order includes an order for a hammer and a pencil, and the item placement service may perform a look-up operation to identify the physical-item identifier associated with each of the hammer and the pencil. In some embodiments, the multi-item order information 404 may include the physical-item identifiers associated with the items included in the orders, and the item placement service may not need to perform a lookup operation to identify those physical-item identifiers.

In operation 408, the item placement service may generate a multi-item order graph 412 based on the multi-item order information 404. In the example illustrated in FIG. 4A, the multi-item order graph 412 may include a node for each distinct physical-item identifier included in the multi-item order information 404. Thus, while the multi-item order information 404 includes several instances of the physical-item identifier A, the multi-item order graph 412 may include only one node that represents the physical-item identifier A. Further, the multi-item order graph 412 may include edges between nodes to indicate that the physical-item identifiers corresponding to those nodes are associated with a common multi-item order. For example, physical-item identifiers A and B were associated with at least one common multi-item order in the multi-item order information 404 (e.g., order {A, B}), and thus the multi-item order graph 412 may include an edge between the nodes representing physical-item identifiers A and B (e.g., nodes "A" and "B").

In some embodiments, the item placement service may apply a weight to each edge in the multi-item order graph 412. The item placement service may calculate the weight of an edge between two nodes as a number of times the physical-item identifiers represented by the two nodes are included/associated with a common multi-item order. As illustrated in FIG. 4A, the edge between nodes A and B has a weight of 2 because physical-item identifiers A and B are common to two multi-item orders included in the multi-item order information 404 (e.g., order {A, B} and order {A, B, E}).

In some embodiments, the item placement service may generate the multi-item order graph 412 based on different parameters. For example, the item placement service may use the multi-item order information 404 to generate a "split-multi-item" order graph (not shown). In such embodiments, the split-multi-item order graph may include a node for each distinct physical-item identifier as described above, but the split-multi-item order graph may include an edge between two nodes only in the event that a multi-item order for items associated with the physical-item identifiers represented by those nodes was split (e.g., multiple shipments were required to fulfill that multi-item order). Further, the weight of the edge between two nodes in the split-multi-item order graph may be equal to or based on the number of multi-item orders that have split, wherein the multi-item orders are common to the physical-item identifiers associated with the two nodes.

In other embodiments, the item placement service may generate a "weighted" multi-item order graph (not shown) in operation 408. The weighted multi-item order graph may include nodes as described above with reference to the multi-item order graph 412. However, in some embodiments, the weights of edges may be normalized to account for the number of unique physical-item identifiers associated with a single multi-item order. As such, a multi-item order associated with fewer distinct physical-item identifiers may result in higher weights between nodes than another multi-item order associated with a greater number of unique distinct physical-item identifiers. By generating the "weighted" multi-item order graph, the item placement service may de-emphasize relationships between physical-item identifiers that are included with many other identifiers.

In some embodiments, the item placement service may further obtain or receive item similarity information 402, such as from an item similarity data repository 214 (e.g., as described with reference to FIG. 2A). As described, the item similarity information 402 may include relationship information between physical-item identifiers. For example, the item similarity information 402 may indicate that a first item has a high affinity with a second item (e.g., a consumer who purchases the first item is highly likely to purchase the second item). However, in some embodiments, such affinity or similarity information may be asymmetrical, such that two items do not share the same affinity for each other. In the example illustrated in FIG. 4A, an item associated with physical-item identifier A may have an affinity/similarity score of 4 with an item associated with physical-item identifier E. However, the item associated with physical-item identifier E may only have an affinity/similarity score of 2 with an item associated with physical-item identifier A. This may correspond to a real world example in which a consumer who orders a flashlight may be likely to co-order a battery for the flashlight; however, a consumer who orders a battery may not be as likely to co-order a flashlight. In some embodiments, each unique physical-item identifier may have affinity/similarity scores for up to a certain number of other physical-item identifiers (e.g., 100 other physical-item identifiers).

In some embodiments, the affinity scores included in the item similarity information 402 may be computed (e.g., by the item placement service or by another device in the system 204) based on item order information over a period of time. For example, a computing device in the system 204 may obtain order information over the past two years to determine items that have been purchased together. In such embodiments, the affinity/similarity scores may represent the expected value of ordering two unrelated items, and the scores may be weighted such that newer order information is given more weight than older order information.

In operation 406, the item placement service may generate a similarity graph 410 based on the item similarity information 402. In the example illustrated in FIG. 4A, the similarity graph 410 may include a node for each distinct physical-item identifier included in the item similarity information 402. Further, in the similarity graph 410, a first node may be connected with an edge to a second node in the event that there is a non-zero affinity/similarity score between the underlying items represented by the first node and the second node. In such embodiments, the non-zero score may be from the first node to the second node and/or from the second node to the first node. In some embodiments, the item placement service may assign a weight to each edge in the similarity graph 410. The weight of an edge between two nodes may be the average affinity/similarity score between the underlying items associated with the two nodes. In the example illustrated in FIG. 4A, the physical-item identifier A and the physical-item identifier E may be represented by nodes A and E, respectively. Further, the item placement service may calculate the weight of the edge between nodes A and E as the score of the item associated with physical-item identifier A's affinity/similarity to an item associated with physical-item identifier E (e.g., a score of 4) and the score of the item associated with physical-item identifier E's affinity/similarity to an item associated with physical-item identifier A (e.g., a score of 2). As such the weight assigned to the edge between nodes A and E may be 3 (e.g., 3=(4+ 2)/2). In another example, the item placement service may calculate the weight of the edge between nodes A and C as 1 because the score of the affinity of an item associated by physical-item identifier A for an item associated with physical-item identifier C is 2, and the score of the affinity of an item associated with physical-item identifier C for an item associated with physical-item identifier A is 0 (e.g., 1=(2+ 0)/2).

In operation 414, the item placement service may merge the similarity graph 410 and the multi-item order graph 412 to generate an input graph 416. In some embodiments, the item placement service may modify the multi-item order graph 412 based on the information included in the similarity graph 410 to yield the input graph 416.

The input graph 416 may only include nodes that are included in both the multi-item order graph 412 and the similarity graph 410. In the example illustrated in FIG. 4A, the input graph 416 includes nodes A, B, C, E, and Q because these nodes are represented in each of the similarity graph 410 and the order graph 412. However, node D in the multi-item order graph 412 is not already included in the input graph 416 because node D is not represented in the similarity graph 410.

The item placement service may determine the edges between nodes in the input graph 416 by adding edges from the similarity graph 410 to the multi-item order graph 412 if those edges are not included in the multi-item order graph 412. In the example illustrated in FIG. 4A, the multi-item order graph 412 includes an edge between nodes B and C but does not include an edge between nodes B and Q. The similarity graph 410, however, does include an edge between nodes B and Q. Thus, in the input graph 416, the item placement service may place an edge between nodes B and Q. Further, in some embodiments, an edge added from the similarity graph 410 may have a low, default weight (e.g., 1) because the physical-item identifiers represented by the two nodes were not included in a multi-item order of the multi-item order information 404. In the above example, the weight of the edge between nodes B and Q in the input graph 416 may be equal to 1 because the edge originated in the similarity graph 410, not from the multi-item order graph 412.

In some embodiments, merging the similarity graph 410 with the multi-item order graph 412 to generate the input graph 416 may eliminate outliers and other spurious data regarding the relationships between items represented by the physical-item identifiers in the multi-item order information 404. For example, the similarity graph 410 may not include nodes for completely unrelated physical-item identifiers or for physical-item identifiers associated with one-of-a-kind items. As such, merging the graphs 410, 412 may ensure that that these "one-off" items are not represented in the input graph 416.

Figure 4B:
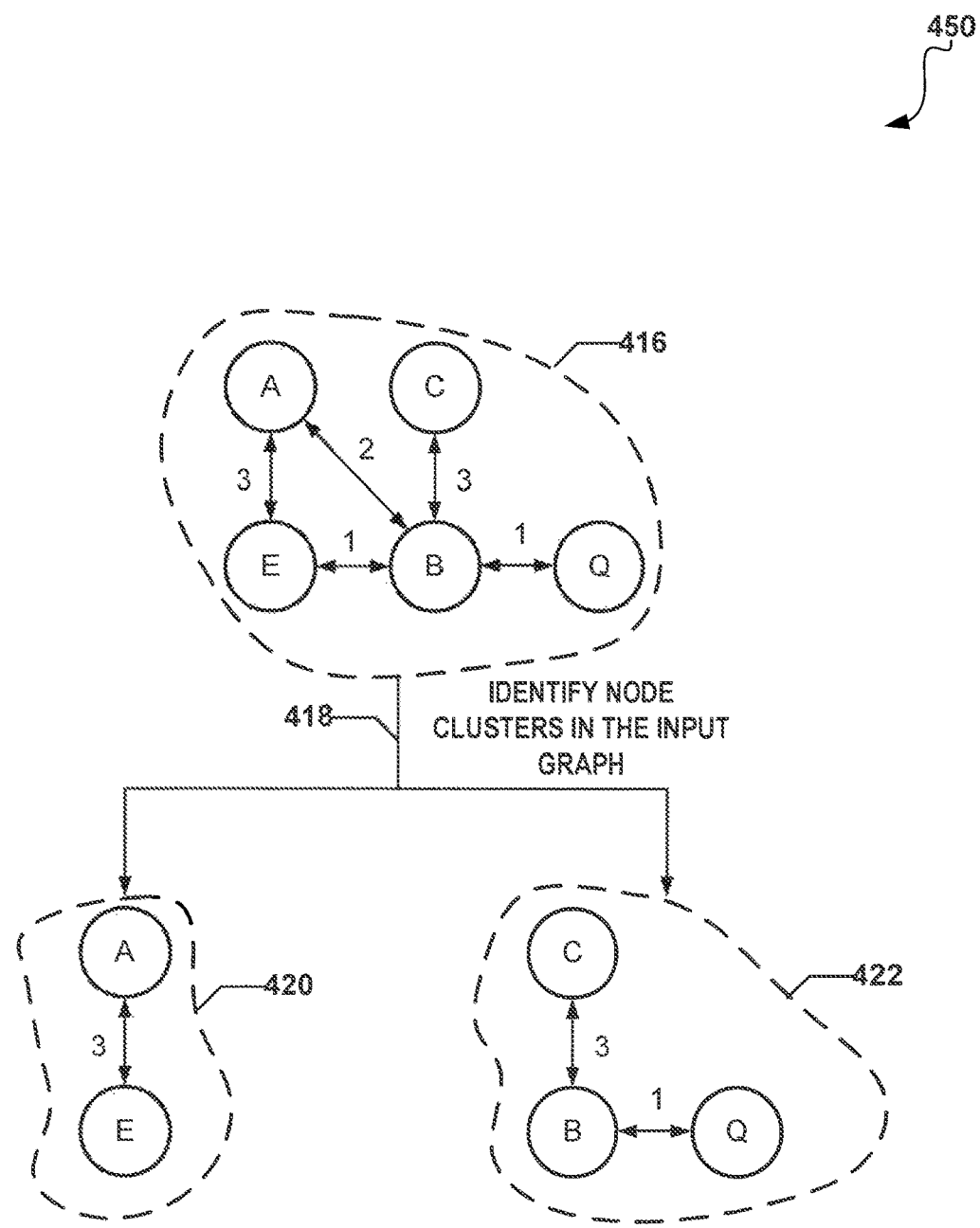
FIG. 4B is a component diagram illustrating a process for identifying clusters of physical-item identifiers within an input graph, according to some embodiments.

FIG. 4B illustrates a component diagram representing an example process 450 for identifying clusters of physical-item identifiers in the input graph 416, according to various embodiments. In some embodiments, the item placement service may begin performing the process 450 in response to merging the multi-item order graph 412 and the similarity graph 410 in operation 414 to form the input graph 416, as described with reference to FIG. 4A.

Thus, with reference to FIG. 4B, the item placement service may analyze the input graph 416 in order to identify clusters of nodes in the input graph 416, in operation 418. The item placement service may apply various partitioning algorithms to the input graph to generate two or more clusters of nodes. For example, the item placement service may apply a k-way partitioning operation. In other examples, the item placement service may apply one of k-means, spectrum clustering, and affiliation-based partitioning operations to separate the input graph 416 into clusters. In some embodiments in which the item placement service performs k-way partitioning operations to the input graph 416, the item placement service may determine a number of clusters and may partition the input graph 416 into k partitions.

The item placement service may partition nodes based on edge weight. In the example illustrated in FIG. 4B, the item placement service may partition the nodes in the input graph 416 into a first cluster 420 and a second cluster 422. In partitioning the nodes in the input graph 416, the item placement service may analyze the weights of the edges between the nodes in the graph and may partition the nodes in such a way as to minimize the "cost" of breaking edges between nodes, wherein breaking a higher-weighted edge may be more "costly" than breaking a lower-weighted edge.

In this example, the item placement service may create two clusters by breaking the edges between nodes A and B and between nodes E and B due to the relatively low weights of these edges.

Further, in some examples, in addition to (or instead of) partitioning nodes into clusters based on the sum of the edge weights that must be cut as described above, the item placement service may further attempt to partition the nodes into clusters of roughly the same size. For example, in one embodiment, each cluster in a graph of millions of nodes may include roughly one-thousand nodes each. Further, the item placement service may partition nodes into clusters of a desired size. Specifically, clusters that include too many or too few nodes may not provide an appropriate level of detail regarding the likelihood that the items in the cluster will be ordered together. For example, a large cluster of nodes (e.g., 100,000 identifiers representing an entire product line) may indicate that two items related to physical-item identifiers in that large cluster are likely to be ordered together, but in actuality, there is only a small probability that these items will be ordered together. In another example, a cluster that is very small (e.g., representing only a few items) may ignore meaningful associations between items related to nodes that are not included in the small cluster. Thus, in such embodiments, the item placement service may partition the graph into groups of nodes of a similar size that is between a lower size threshold and an upper size threshold. In some embodiments, the cluster size thresholds targeted may be modified over time by the placement service based on various considerations using machine learning techniques.

After partitioning the input graph 416 into the clusters 420, 422, the item placement service may identify a cluster of physical-item identifiers corresponding with the cluster 420 (e.g., a cluster including physical-item identifiers A and E) and another cluster of physical-item identifiers corresponding with the cluster 422 (e.g., a cluster including physical-item identifiers C, B, and Q). In some embodiments, the item placement service may utilize these identified clusters of physical-item identifiers to coordinate the placement of physical items in one or more storage facilities (e.g., as described with reference to block 310 of the method 300 of FIG. 3).

Figure 5:
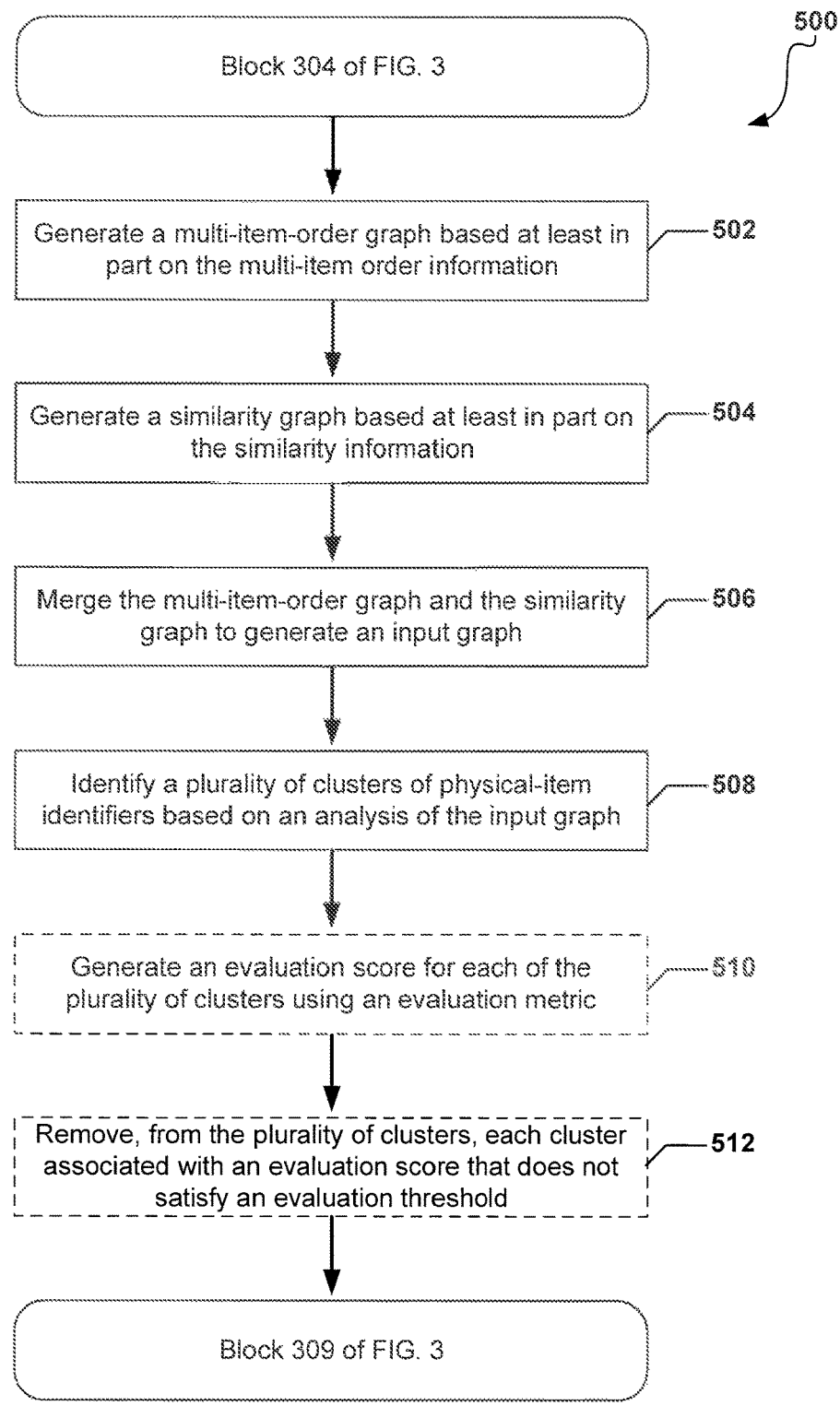
FIG. 5 is a process flow diagram illustrating a method, implemented at least in part by an item-placement service, for identifying clusters of physical-item identifiers based on an analysis of an input graph, according to some embodiments.

FIG. 5 is a flow diagram of an illustrative method 500 that may be implemented by an item placement service (e.g., the item placement service 104 described with reference to FIGS. 1-2B). The operations of the method 500 implement an embodiment of the operations of blocks 306-308 as described with reference to FIG. 3. As such, the item placement service may begin performing the operations of the method 500 in response to obtaining similarity information for a plurality of physical items in block 304 of the method 300 and obtaining multi-item order information for a plurality of multi-item orders in block 302 of the method 300, as described with reference to FIG. 3.

In block 502, the item placement service may generate a multi-item order graph based at least in part on multi-item order information, such as the multi-item order information obtained in block 302 of the method 300 (see, e.g., FIG. 3). In some embodiments of the operations performed in block 502, the item placement service may perform operations similar to those described with reference to operation 408. As such, in some such embodiments, the multi-item order graph generated in block 502 may be similar to the multi-item order graph 412 described with reference to FIG. 4A. Thus, as described above (e.g., with reference to FIG. 4A), the multi-item order graph generated in block 502 may include a node for each distinct physical-item identifier represented in the multi-item order information, as well as an edge between two nodes if those nodes are associated with a common multi-item order. Further, an edge between two nodes may have a weight corresponding to a number of multi-item orders with which the physical-item identifiers represented by the two nodes are associated.

Based at least in part on the similarity information received in block 304 of the method 300 (see, e.g., FIG. 3), the item placement service may generate a similarity graph, in block 504. In some embodiments of the operations performed in block 504, the item placement service may perform operations similar to those described with reference to operation 406. As such, in such embodiments, the similarity graph generated in block 504 may be similar to the similarity graph 410 described with reference to FIG. 4A. Thus, as described above (e.g., with reference to FIG. 4A), the similarity graph generated in block 504 may include a node for each distinct physical-item identifier included in the similarity information. The similarity graph may also include an edge between two nodes if there is a non-zero affinity/similarity score associated with at least one of two items associated with the two nodes.

While the operations performed in block 502 are illustrated as occurring before the operations of block 504 in FIG. 5, the order of operations of blocks 502 and 504 may be performed in any order, including simultaneously or in parallel, in various embodiments.

In block 506, the item placement service may merge the multi-item order graph generated in block 502 with the similarity graph generated in block 504 in order to generate an input graph. In some embodiments of the operations performed in block 506, the item placement service may perform operations similar to those described with reference to operation 414. The input graph generated in block 506 may be similar to the input graph 416 described with reference to FIG. 4A. As a result, the input graph generated in block 506 may only include nodes that are included in both the multi-item order graph generated in block 502 and the similarity graph generated in block 504. Further, the input graph generated in block 506 may include weighted edges between nodes as represented in the multi-item order graph and the similarity graph, as described above with reference to FIG. 4A.

In block 508, the item placement service may identify a plurality of clusters of physical-item identifiers based on an analysis of the input graph. In some embodiments of the operations performed in block 508, the item placement service may identify a plurality of clusters by performing operations similar to operation 418, as described with reference to FIG. 4B. Thus, in some embodiments, the item placement service may apply one of various partitioning operations to the input graph to generate multiple clusters of nodes. In a non-limiting example, the item placement service may apply a k-way partitioning algorithm, a k-means partitioning process, a spectrum clustering operation, an affiliation-based model, or various other graph partitioning operations.

In some optional embodiments, the item placement service may refine or "filter" the plurality of identifier clusters to remove clusters that are expected to have a low impact on decreasing the overall number of split orders at a storage facility and/or that may have a high cost of implementing in a storage facility.

Thus, in optional block 510, the item placement service may generate an evaluation score for each of the plurality of clusters identified in block 508 using an evaluation metric. In some embodiments of the operations performed in optional block 510, the item placement service may determine whether the cluster has a high internal affinity value. This internal affinity value may be calculated as the ratio of the sum of weighted edges between nodes in the cluster and the sum of weighted edges of nodes in the clusters to nodes outside the cluster. Specifically, the item placement service may associate a higher internal affinity value, and thus a higher evaluation score, to a cluster in which the cluster's weighted sum of internal edges is greater than the weighted sum of the cluster's external edges (e.g., those edges from nodes in the cluster to nodes outside the cluster).

In optional block 512, the item placement service may remove each cluster associated with an evaluation score that does not satisfy an evaluation threshold from the plurality of clusters identified in block 508. For example, the item placement service may determine that a cluster with an affinity value that does not satisfy a minimum affinity threshold should be removed because the physical-item identifiers included in that cluster may only be weakly related or may not indicate a significant likelihood of being included together in future multi-item orders. Because items represented in these removed clusters do not have a significant likelihood of being ordered together, the item placement service may not attempt to initiate transfer of these items to the same storage facility. Specifically, the cost of shipping these items to the same storage facility may outweigh the low expectation of reducing split orders that include items in these removed clusters.

The item placement service may continue by assigning a cluster in the plurality of identified clusters to a storage facility in block 309 of the method 300 (e.g., as described with reference to FIG. 3).

Figure 6:
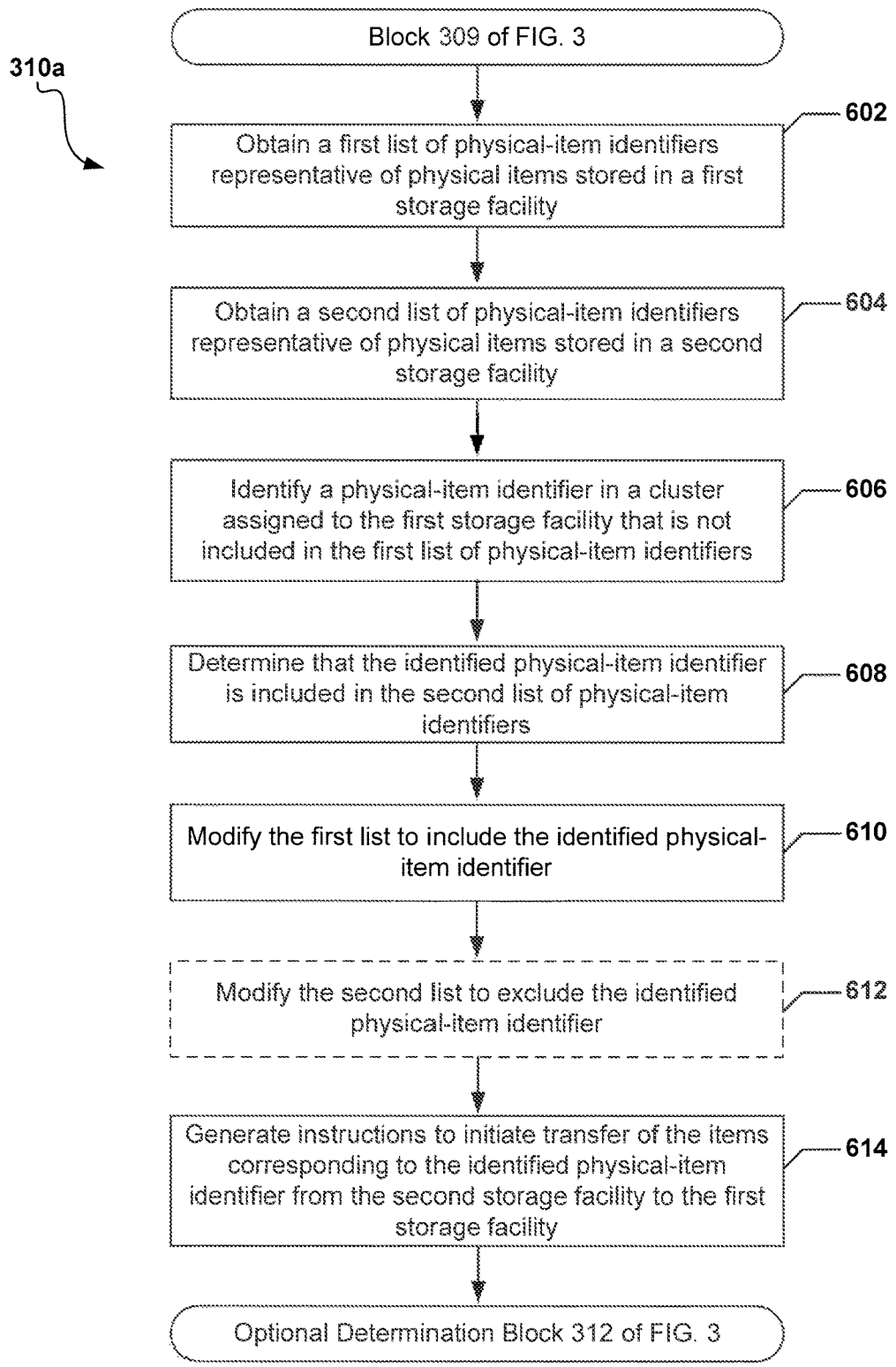
FIG. 6 is a process flow diagram illustrating a method, implemented at least in part by an item-placement service, for initiating transfer of physical items corresponding to physical-item identifiers based at least in part on clusters of physical-item identifiers identified in an input graph, according to some embodiments.

FIG. 6 is a flow diagram of an illustrative method 310*a* that may be implemented by an item placement service (e.g., the item placement service 104 described with reference to FIGS. 1, 2A, and 2B). The operations of the method 310*a* implement an embodiment of the operations of block 310 as described with reference to FIG. 3. As such, the item placement service may begin performing the operations of the method 310*a* in response to assigning a cluster of physical-item identifiers to a storage facility in block 309 of the method 300, as described with reference to FIG. 3.

To reduce the likelihood of split orders, the item placement service may update inventory information for the one or more storage facilities to reflect the physical-item identifiers that have been assigned to each of the one or more storage facilities. In some embodiments, the item placement service may update inventory lists for the one or more storage facilities by adding and/or removing certain physical-item identifiers from lists of physical-item identifiers representative of the physical items stored in those one or more storage facilities.

Thus, with reference to FIG. 6, the item placement service may receive a first list of physical-item identifiers representative of physical items stored in a first storage facility, in block 602. As described above (e.g., with reference to FIGS. 1, 2A, and 2B), the item placement service may obtain the first list of physical-item identifiers by requesting the list directly from one or more computing devices operating at the storage facility. Additionally (or alternatively), the item placement service may query a centralized data repository that includes inventory information for multiple storage facilities (e.g., the inventory data repository 216 as described with reference to FIGS. 2A and 2B). Similarly, in block 604, the item placement service may obtain a second list of physical-item identifiers representative of physical items stored in a second storage facility.

In block 606, the item placement service may identify a physical-item identifier in a cluster assigned to the first storage facility that is not included in the first list of physical-item identifiers obtained in block 602. For example, the item placement service may attempt to match each physical-item identifier in the assigned cluster to a physical-item identifier included in the first list and, based on the comparisons, may identify one or more physical-item identifiers in the assigned cluster that do not match a physical-item identifier included in the first list.

In block 608, the item placement service may determine that the physical-item identifier identified in block 606 is included in the second list of physical-item identifiers. For instance, the item placement service may search the second list for an entry that matches the physical-item identifier identified in block 606.

In response to determining that the physical-item identifier identified in block 606 is included in the second list of physical-item identifiers, the item placement service may modify the first list to include the identified physical-item identifier, in block 610. In some optional embodiments, the item placement service may also modify the second list to exclude the identified physical-item identifier, in optional block 612.

By including and/or excluding physical-item identifiers from the lists, the item placement service may initiate a reorganization of the physical items stored in the first and/or second storage facility. For example, the item placement service may generate instructions that initiate transfer of the items corresponding to the identified physical-item identifier from the second storage facility to the first storage facility, in block 614. Specifically, the item placement service may generate an electronic message delivered to a computing device in the second storage facility to begin relocating items associated with the identified physical-item identifier to the first storage facility (e.g., the instructions 124 sent to the Warehouse System B 108 as described with reference to FIG. 1). In this example, the electronic message may be presented to a system operator associated with the second storage facility upon login. In some embodiments, the generated instructions may include the items (and/or physical-item identifiers associated with those items) that have been identified, as well as the intended destination of those items, such as a physical address of the storage facility and/or a physical location within the storage facility (e.g., a particular shelf, rack, row, area, etc.).

The item placement service may optionally continue by determining whether updated information is available in optional determination block 312 of the method 300 (as described with reference to FIG. 3).

In other embodiments (not shown), the item placement service may identify a physical-item identifier in a cluster that is assigned to a storage facility that is not included in a list of physical-item identifiers for that storage facility, such as by performing operations described with reference to blocks 602 and 606. In some such embodiments, rather than attempting to transfer items related to the "missing" physical-item identifier as described above, the item placement service may identify a vendor (or vendors) that supplies items related to the missing physical-item identifier. The item placement service may then transmit a message to a computing device of the vendor (e.g., the vendor devices 226 described with reference to FIG. 2A) instructing the vendor to supply the storage facility with items associated with the missing physical-item identifier. As a result, the item placement service may ensure that the storage facility stores items represented by each physical-item identifier included in the assigned cluster.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted and/or executed out of order from the order shown in the corresponding figures and/or from the order as discussed above. For example, functions described above may be executed substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
   an electronic data store; and
   a hardware computing device in communication with the electronic data store, the hardware computing device comprising one or more processors configured with processor-executable instructions to perform operations comprising:
   obtaining multi-item order information for a first plurality of physical-item identifiers associated with multi-item orders, wherein the multi-item order information indicates physical-item identifiers associated with items that have been ordered together;
   obtaining similarity information for a second plurality of physical-item identifiers, wherein the similarity information indicates physical-item identifiers associated with items that are similar to each other;
   generating a graph based at least in part on the order information and the similarity information, wherein:
   the graph comprises nodes representing a subset of the first plurality of physical-item identifiers in the multi-item order information, wherein the subset comprises physical-item identifiers of the first plurality of physical-item identifiers that are also represented in the second plurality of physical-item identifiers; and
   an edge between two nodes in the graph is indicative of a relation between physical-item identifiers represented by the two nodes, wherein the relation is determined based on at least one of the order information or the similarity information;
   identifying a plurality of clusters of physical-item identifiers based on an analysis of the graph;
   assigning a cluster in the plurality of identified clusters to a first storage facility;
   modifying a first list of physical-item identifiers representative of physical items stored in the first storage facility based on the cluster assigned to the first storage facility; and
   sending an electronic message that initiates shipment to the first storage facility of at least one item associated with a physical-item identifier included in the cluster.

2. The system of claim 1, wherein each of the plurality of clusters is identified to include a similar number of nodes based at least in part on a threshold number of clusters.

3. The system of claim 1, wherein the one or more processors are configured with processor-executable instructions to perform operations such that identifying the plurality of clusters further comprises:
   determining a desired number of clusters;
   determining a weight of edges between each pair of nodes in the graph; and
   partitioning the graph into the desired number of clusters, such that each individual cluster has a sum of each weighted edge between two nodes in the individual cluster that exceeds a sum of each weighted edge between a node within the individual cluster and a node outside the individual cluster.

4. The system of claim 1, wherein:
   the electronic data store stores data regarding physical locations used to store physical items associated with physical-item identifiers; and
   the one or more processors are configured with processor-executable instructions to perform operations such that modifying the first list of physical-item identifiers comprises modifying physical locations used to store physical items associated with physical-item identifiers included in the cluster assigned to the first storage facility.

5. The system of claim 1, wherein the one or more processors are configured with processor-executable instructions to perform operations such that generating the graph comprises:
   generating a multi-item order graph comprising a node for each distinct physical-item identifier in the first plurality of physical-item identifiers;
   generating a similarity graph comprising a node for each distinct physical-item identifier in the second plurality of physical-item identifiers; and
   merging the multi-item order graph and the similarity graph.

6. The system of claim 5, wherein the processor is configured with processor-executable instructions to perform operations such that a weight of an edge between two nodes in the multi-item order graph represents a number of times in which physical-item identifiers associated with the two nodes occur in a common multi-item order.

7. The system of claim 5, wherein the processor is configured with processor-executable instructions to perform operations such that a weight of an edge between two nodes in the multi-item order graph represents a number of times in which physical-item identifiers associated with the two nodes occur in a common multi-item order and a total number of distinct physical-item identifiers associated with the common multi-item order.

8. The system of claim 5, wherein the processor is configured with processor-executable instructions to perform operations such that a weight of an edge between two nodes in the similarity graph represents a degree of similarity between physical-item identifiers associated with the two nodes in the similarity graph.

9. The system of claim 8, wherein the processor is configured with processor-executable instructions to perform operations such that:
   the degree of similarity between the physical-item identifiers associated with the two nodes in the similarity graph is asymmetrical; and
   the weight of the edge between the two nodes in the similarity graph is an average of asymmetrical degrees of similarity between the physical-item identifiers associated with the two nodes in the similarity graph.

10. The system of claim 1, wherein the processor is configured with processor-executable instructions to perform operations such that identifying a plurality of clusters of physical-item identifiers based on an analysis of the graph comprises:
   generating an evaluation score for each of the plurality of clusters using an evaluation metric; and
   removing a cluster from the plurality of clusters associated with an evaluation score that does not satisfy an evaluation threshold.

11. The system of claim 1, wherein the one or more processors are configured with processor-executable instructions to perform operations such that assigning a cluster in the plurality of identified clusters to a first storage facility comprises:
   obtaining first information regarding a physical capacity of the first storage facility;
   obtaining second information regarding physical items stored in the first storage facility; and
   assigning the cluster in the plurality of identified clusters to the first storage facility based at least in part on the first information and the second information.

12. The system of claim 1, wherein the one or more processors are configured with processor-executable instructions to perform operations such that identifying a plurality of clusters of physical-item identifiers based on an analysis of the graph comprises applying a k-way partitioning algorithm to the graph.

13. A computer-implemented method comprising:
   obtaining order information for a first plurality of physical-item identifiers associated with multi-item orders;
   obtaining similarity information for a second plurality of physical-item identifiers;
   generating a multi-item order graph comprising a node for each distinct physical-item identifier in the first plurality of physical-item identifiers;
   generating a similarity graph comprising a node for each distinct physical-item identifier in the second plurality of physical-item identifiers;
   merging the multi-item order graph and the similarity graph to generate an input graph, wherein the input graph comprises nodes representing physical-item identifiers represented in both of the first plurality of physical-item identifiers and the second plurality of physical-item identifiers;
   identifying a plurality of clusters of physical-item identifiers based on an analysis of the input graph;
   assigning a cluster in the plurality of identified clusters to a storage facility;
   modifying a list of physical-item identifiers representative of physical items stored in the storage facility based on the cluster assigned to the storage facility; and
   sending an electronic message that initiates shipment to the storage facility of at least one item associated with a physical-item identifier included in the cluster.

14. The computer-implemented method of claim 13, wherein the electronic message is sent to at least one of (a) a computing device of a second storage facility from which the at least one item is to be transferred or (b) a computing device of a vendor associated with the at least one item.

15. The computer-implemented method of claim 13, wherein identifying a plurality of clusters of physical-item identifiers based on an analysis of the input graph further comprises:
   generating an evaluation score for each of the plurality of clusters using an evaluation metric; and
   removing a cluster from the plurality of clusters associated with an evaluation score that does not satisfy an evaluation threshold.

16. The computer-implemented method of claim 15, wherein generating an evaluation score for each of the plurality of clusters using an evaluation metric comprises determining a percentage of edges in the input graph represented in the multi-item order graph.

17. The computer-implemented method of claim 15, wherein generating an evaluation score for each of the plurality of clusters using an evaluation metric comprises:
   removing edges of the multi-item order graph to generate a de-noised multi-item order graph, wherein the removed edges have a value of one; and
   determining a percentage of edges in the input graph represented in the de-noised multi-item order graph.

18. The computer-implemented method of claim 13, wherein each physical-item identifier from the first plurality of physical-item identifiers is included as a node in the input graph if the particular physical-item identifier is also included in the second plurality of physical-item identifiers.

19. The computer-implemented method of claim 13, wherein each of the plurality of clusters is identified to include a similar number of nodes based at least in part on a threshold number of clusters.

20. The computer-implemented method of claim 13, wherein identifying the plurality of clusters further comprises:
   determining a desired number of clusters;
   determining a weight of edges between each pair of nodes in the input graph; and
   partitioning the input graph into the desired number of clusters, such that each individual cluster has a sum of each weighted edge between two nodes in the individual cluster that exceeds a sum of each weighted edge between a node within the individual cluster and a node outside the individual cluster.

* * * * *